(12) United States Patent
Kim

(10) Patent No.: US 12,469,857 B2
(45) Date of Patent: Nov. 11, 2025

(54) MEMBRANE-ELECTRODE ASSEMBLY, MANUFACTURING METHOD THEREFOR, AND FUEL CELL COMPRISING SAME

(71) Applicant: KOLON INDUSTRIES, INC., Seoul (KR)

(72) Inventor: Jung Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 990 days.

(21) Appl. No.: 17/601,919

(22) PCT Filed: Jun. 18, 2020

(86) PCT No.: PCT/KR2020/007886
§ 371 (c)(1),
(2) Date: Oct. 6, 2021

(87) PCT Pub. No.: WO2021/006498
PCT Pub. Date: Jan. 14, 2021

(65) Prior Publication Data
US 2022/0181652 A1    Jun. 9, 2022

(30) Foreign Application Priority Data

Jul. 8, 2019 (KR) .................. 10-2019-0082107
Nov. 19, 2019 (KR) .................. 10-2019-0148939

(51) Int. Cl.
*H01M 8/0273* (2016.01)
*H01M 8/0284* (2016.01)
(Continued)

(52) U.S. Cl.
CPC ....... *H01M 8/0273* (2013.01); *H01M 8/0284* (2013.01); *H01M 8/0286* (2013.01); *H01M 8/1004* (2013.01); *H01M 2008/1095* (2013.01)

(58) Field of Classification Search
None
See application file for complete search history.

(56) References Cited

U.S. PATENT DOCUMENTS

2003/0121603 A1    7/2003  Oh
2006/0078781 A1*   4/2006  Stegink .............. H01M 8/028
                                                        429/510
(Continued)

FOREIGN PATENT DOCUMENTS

CN    103682393 A    3/2014
CN    106505212 A    3/2017
(Continued)

OTHER PUBLICATIONS

The office action dated Sep. 27, 2023 related to the corresponding Chinese Patent application.
(Continued)

*Primary Examiner* — Alix E Eggerding
(74) *Attorney, Agent, or Firm* — Harvest IP Law, LLP

(57) ABSTRACT

A membrane-electrode assembly, a manufacturing method therefor, and a fuel cell comprising same are disclosed. The method for preparing a membrane-electrode assembly, of the present invention, comprises the steps of: forming a first electrode on a first surface of an electrolyte membrane; forming a first sub-gasket on the first surface of the electrolyte membrane by applying a first liquid material; forming a second electrode on a second surface of the electrolyte membrane; and forming a second sub-gasket on the second surface of the electrolyte membrane.

18 Claims, 24 Drawing Sheets

(51) Int. Cl.
    *H01M 8/0286*     (2016.01)
    *H01M 8/1004*     (2016.01)
    *H01M 8/10*     (2016.01)

(56) References Cited

U.S. PATENT DOCUMENTS

| | | | |
|---|---|---|---|
| 2009/0162734 A1* | 6/2009 | Yandrasits | H01M 8/2404 |
| | | | 429/514 |
| 2012/0141921 A1 | 6/2012 | Han | |
| 2017/0069926 A1 | 3/2017 | Jeong | |
| 2017/0256810 A1 | 9/2017 | Lee | |
| 2020/0212457 A1* | 7/2020 | Ko | H01M 8/1004 |

FOREIGN PATENT DOCUMENTS

| | | | |
|---|---|---|---|
| CN | 108232256 A | | 6/2018 |
| EP | 3605690 A1 | | 2/2020 |
| JP | H10199551 A | | 7/1998 |
| JP | 2010-073562 A | | 4/2010 |
| JP | 2011028852 A | | 2/2011 |
| JP | 2013062169 A | * | 4/2013 |
| JP | 2017033915 A | | 2/2017 |
| KR | 20130033581 A | | 4/2013 |
| KR | 101703617 B1 | | 2/2017 |
| KR | 20170049662 A | | 5/2017 |
| KR | 20180126708 A | | 11/2018 |
| KR | 20190037878 A | | 4/2019 |

OTHER PUBLICATIONS

JP office action dated Dec. 1, 2022 related to the corresponding Japanese Patent application.
The search report dated Nov. 15, 2024 related to the corresponding European Patent application.
The JP office action dated Apr. 24, 2023 related to the corresponding Japanese Patent application.
The office action dated Mar. 27, 2024 related to the corresponding Japanese divisional Patent application.
The office action dated Jul. 28, 2025 related to the corresponding European Patent application.

\* cited by examiner

MEMBRANE-ELECTRODE ASSEMBLY, MANUFACTURING METHOD THEREFOR, AND FUEL CELL COMPRISING SAME

CROSS REFERENCE TO RELATED APPLICATIONS

This application is a National Stage of International Application No. PCT/KR2020/007886 filed Jun. 18, 2020, claiming priority based on Korean Patent Application No. 10-2019-0082107 filed Jul. 8, 2019 and Korean Patent Application No. 10-2019-0148939 filed Nov. 19, 2019.

TECHNICAL FIELD

The present disclosure relates to a membrane-electrode assembly, a method of manufacturing the same, and a fuel cell including the same.

BACKGROUND ART

A polymer electrolyte membrane fuel cell (PEMFC), which is an apparatus that generates electricity using a structure in which unit cells, each of which includes a membrane-electrode assembly (MEA) and a separator, are stacked, has attracted attention as a next-generation energy source capable of replacing fossil fuels, since the polymer electrolyte membrane fuel cell exhibits high energy efficiency and environmentally friendly characteristics.

The membrane-electrode assembly includes an oxidation electrode (also referred to as an anode or a fuel electrode), a reduction electrode (also referred to as a cathode or an air electrode), and an electrolyte membrane therebetween. A polymer electrolyte membrane is generally used as the electrolyte membrane.

FIG. 1 is a schematic view showing the operation of a fuel cell.

When fuel such as hydrogen gas is supplied to an oxidation electrode 21, hydrogen ions ($H^+$) and electrons ($e^-$) are generated at the oxidation electrode 21 as the result of an oxidation reaction of hydrogen. The generated hydrogen ions are transferred to a reduction electrode 22 via an electrolyte membrane 10, and the generated electrons are transferred to the reduction electrode via an external circuit. A reduction reaction of oxygen occurs at the reduction electrode 22, to which air including the oxygen is supplied. At the reduction electrode 22, the oxygen is bonded with the hydrogen ions and electrons, whereby water is generated together with heat.

If the hydrogen introduced to the oxidation electrode 21 and the air (oxygen) introduced to the reduction electrode 22 move to opposite electrodes as the result of penetration, performance of the cell is deteriorated. Consequently, it is necessary to prevent hydrogen and air (oxygen) from penetrating the electrolyte membrane 10 and mixing. The ability to inhibit hydrogen and air (oxygen) from being mixed with each other as the result of penetrating the electrolyte membrane 10 is connected directly with performance of the electrolyte membrane 10. Conventionally, gaskets are joined to the edge of the electrolyte membrane 10 corresponding to the edge of the membrane-electrode assembly excluding the electrodes in order to inhibit hydrogen and air (oxygen) from moving to opposite electrodes as the result of penetrating the electrolyte membrane 10.

Among the methods of disposing a gasket at the electrolyte membrane 10, a method of laminating a film type sub-gasket on the electrolyte membrane 10 by heating and pressing is generally used. In the case of this method, however, (i) the electrodes 21 and 22 are damaged when the sub-gaskets are laminated by heating and pressing, (ii) sub-gaskets having various film thicknesses must be separately prepared in order to adjust the thickness of the sub-gasket, which is very troublesome, since the final thickness of the sub-gasket depends on the film thickness, (iii) when a portion of the film type sub-gasket is attached on the edge of an electrode, a step corresponding to the thickness of the electrode is formed at the sub-gasket, the step of the sub-gasket deteriorating workability in a subsequent process (e.g. a process of forming/assembling a gas diffusion layer GDL), and (iv) the step causes an air gap between the sub-gasket film and the side surface of the electrode, whereby remarkably reducing the gas leakage prevention function of the sub-gasket film.

DISCLOSURE

Technical Problem

Embodiments of the present disclosure provide a membrane-electrode assembly capable of solving the above problems, a method of manufacturing the same, and a fuel cell including the same.

An aspect of the present disclosure is to provide a membrane-electrode assembly including a sub-gasket having no or very small step which deteriorates workability in a subsequent process.

Another aspect of the present disclosure is to provide a method of manufacturing a membrane-electrode assembly of excellent performance with high productivity while not causing damage to electrodes.

A further another aspect of the present disclosure is to provide a fuel cell manufactured using a membrane-electrode assembly including a sub-gasket having no or very small step which otherwise might deteriorate the workability in a subsequent process.

Technical Solution

In accordance with an aspect of the present disclosure, there is provided a membrane-electrode assembly including: an electrolyte membrane having a first surface and a second surface opposite to the first surface, the electrolyte membrane including an active area and a non-active area surrounding the active area; a first electrode disposed over the first surface of the electrolyte membrane, the first electrode covering the active area; a first sub-gasket disposed over the first surface of the electrolyte membrane, the first sub-gasket having a first window to expose a central part of the first electrode; a second electrode disposed over the second surface of the electrolyte membrane, the second electrode covering the active area; and a second sub-gasket disposed over the second surface of the electrolyte membrane, the second sub-gasket having a second window to expose a central part of the second electrode, wherein, the first sub-gasket includes a first overlap area overlapping an edge of the first electrode and a first non-overlap area covering the non-active area, there is no step or a first step between the first overlap area and the first non-overlap area, a height of the first step formed by the first overlap area and the first non-overlap area is 0.5 times or less the thickness of the first electrode, the second sub-gasket includes a second overlap area overlapping an edge of the second electrode and a second non-overlap area covering the non-active area, and there is no step or a second step between the second overlap area and the second non-overlap area, a height of the second step formed by the second overlap area and the second non-overlap area is 0.5 times or less the thickness of the second electrode.

There may be no air gap between the first sub-gasket and the first electrode or, even though there is a first air gap between the first sub-gasket and the first electrode, a volume of the first air gap may satisfy Equation 1 below, and there may be no air gap between the second sub-gasket and the second electrode or, even though there is a second air gap between the second sub-gasket and the second electrode, a volume of the second air gap may satisfy Equation 2 below:

$$V_1 \leq 0.5 \times T_1^2 \times (W_1 + L_1) \quad \text{Equation 1:}$$

$$V_2 \leq 0.5 \times T_2^2 \times (W_2 + L_2) \quad \text{Equation 2:}$$

where $V_1$ and $V_2$ are volumes of the first and second air gaps, respectively, $T_1$ and $T_2$ are thicknesses of the first and second electrodes, respectively, $W_1$ and $W_2$ are widths of the first and second electrodes, respectively, and $L_1$ and $L_2$ are lengths of the first and second electrodes, respectively.

In accordance with another aspect of the present disclosure, there is provided a method for manufacturing a membrane-electrode assembly, the method including: forming a first electrode over a first surface of an electrolyte membrane; forming a first sub-gasket over the first surface of the electrolyte membrane by coating a first liquid material; forming a second electrode over a second surface of the electrolyte membrane; and forming a second sub-gasket over the second surface of the electrolyte membrane by coating a second liquid material.

The method may further include at least one of: disposing a first passivation layer over the first electrode before forming the first sub-gasket; and disposing a second passivation layer over the second electrode before forming the second sub-gasket.

The method may further include removing at least one of the first and second passivation layers.

The first electrode may be formed by coating or transfer.

The electrolyte membrane may be supported by a support substrate when forming the first electrode.

The first and second sub-gaskets may be respectively formed by means of any one selected from the group consisting of spray coating, comma coating, and slot die coating, each of which uses a liquid material.

At least one selected from the group consisting of a 3D printer and a partial coating apparatus may be used to form the first and second sub-gaskets.

Each of the first and second liquid materials may include an elastic material that is crosslinkable or curable.

The first and second liquid materials may be identical to each other. In addition, the first and second liquid materials may be different from each other.

Each of the first and second sub-gaskets may include at least one selected from the group consisting of polyethylene terephthalate (PET), polyamide, tetrafluoroethylene/hexafluoropropylene (FEP), fluorine rubber, silicone rubber, hydrocarbon-based elastomer (EPDM, EPR, etc.), and polyurethane.

In at least one of the step of forming the first sub-gasket and the step of forming the second sub-gasket, the first or second sub-gasket may be left for 10 to 600 seconds after coating.

In at least one of the step of forming the first sub-gasket and the step of forming the second sub-gasket, the first or second sub-gasket may be heated at a temperature of 40 to 150° C. after coating.

In at least one of the step of forming the first sub-gasket and the step of forming the second sub-gasket, the first or second sub-gasket may be thermally treated using hot air for 3 to 300 seconds after coating.

Each of the first and second passivation layers may include at least one selected from the group consisting of polyethylene terephthalate (PET), polyimide (PI), tetrafluoroethylene, polyethylene (PE), rubber, and silicone.

The method may further include cutting at least a portion of the electrolyte membrane before forming the first sub-gasket.

In accordance with a further aspect of the present disclosure, there is provided a fuel cell including the membrane-electrode assembly, a gas diffusion layer over the membrane-electrode assembly, and a separator over the gas diffusion layer.

Advantageous Effects

According to an embodiment of the present disclosure, a sub-gasket may be formed by coating, whereby it is possible to easily adjust the thicknesses of the sub-gasket by adjusting the coating thickness, and a direct coating method facilitates mass production and automation. In addition, the sub-gasket may be formed by a direct coating method without heating and pressing processes for film lamination so that damage to electrodes can be prevented, the sub-gasket can have no or very small step, and thus it is possible to improve workability in a subsequent process such as a process for forming/assembling a gas diffusion layer. Furthermore, since any possible air gap between a side surface of the electrode and the sub-gasket can be avoided or minimized, the essential function of the sub-gaskets to prevent leakage of gas can be ensured.

A liquid material that is used for direct coating according to an embodiment of the present invention is crosslinkable at room temperature or thermally crosslinkable, and the sub-gasket formed of the liquid material may exhibit good gas blocking ability and elasticity.

According to an embodiment of the present disclosure, the sub-gasket is integrally formed with a membrane-electrode assembly, whereby the leakage of gas such as hydrogen or air (oxygen) is reduced during the operation of the fuel cell, and a simple manufacturing process facilitates mass production of fuel cells.

Further, according to an embodiment of the present disclosure, the sub-gasket may be made of an elastomer. As a result, at the time of assembly of a fuel cell stack, a difference in thickness between components of the fuel cell stack may be absorbed by the elastomer, whereby it is possible to manufacture a stable stack structure. Furthermore, the thicknesses of the sub-gasket may be easily adjusted, whereby it is possible to optimize and increase the interfacial adhesion between the membrane-electrode assembly and the gas diffusion layer. As a result, performance and durability of the fuel cell may be improved. Moreover, it is not necessary to prepare sub-gaskets having different thicknesses, which reduces the production cost.

DESCRIPTION OF DRAWINGS

The accompanying drawings, which are included to assist in understanding of the present disclosure and are incorporated in and constitute a part of the present specification, illustrate embodiments of the present disclosure and serve to explain the principle of the present disclosure together with the detailed description of the present disclosure.

BEST MODE

Figure 1:
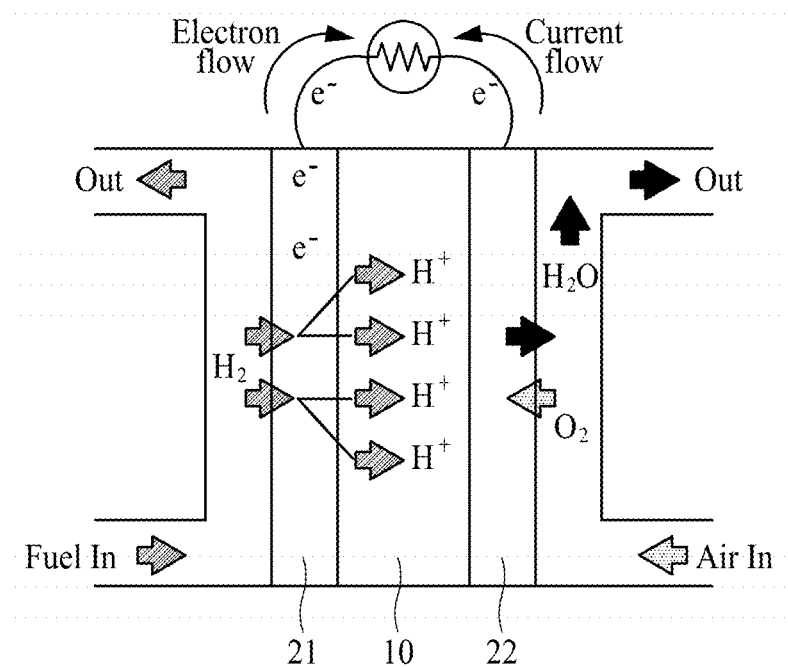
FIG. 1 is a schematic view showing the operation of a fuel cell.

Hereinafter, embodiments of the present disclosure will be described in detail with reference to the accompanying drawings. However, the following embodiments are illustratively provided merely for clear understanding of the present disclosure and do not limit the scope of the present disclosure.

The shapes, sizes, ratios, angles, and numbers disclosed in the drawings for describing embodiments of the present disclosure are merely examples, and thus the present disclosure is not limited to the illustrated details. Like reference numerals refer to like elements throughout the present specification. In the following description, when the detailed description of the relevant known function or configuration is determined to unnecessarily obscure important points of the present disclosure, the detailed description will be omitted.

In the case in which "comprise", "have", and "include" are used in the present specification, another part may also be present unless "only" is used. Terms in a singular form may include plural meanings unless noted to the contrary. Also, in construing an element, the element is to be construed as including an error range even if there is no explicit description thereof.

In describing a positional relationship, for example, when the positional relationship is described as "over", "on", "under", and "next", the case of no contact therebetween may be included, unless "just" or "directly" is used.

Spatially relative terms such as "below/beneath", "lower", "above", or "upper" may be used herein to describe a relationship of a device or an element to another device or another element as shown in the figures. It will be understood that spatially relative terms are intended to encompass different orientations of a device during the use or operation of the device, in addition to the orientation depicted in the figures. For example, if a device in one of the figures is turned upside down, elements described as "below" or "beneath" other elements would then be oriented "above" the other elements.

The exemplary term "below" or "beneath" can, therefore, encompass both an orientation of below and above. In the same manner, the exemplary term "above" or "over" can encompass both an orientation of above and below.

In describing a temporal relationship, for example, when the temporal order is described as "after", "subsequent", "next", and "before", the case which is not continuous may be included, unless "just" or "directly" is used.

It will be understood that, although the terms "first", "second", etc. may be used herein to describe various elements, these elements should not be limited by these terms. These terms are only used to distinguish one element from another. Therefore, a first element could be termed a second element within a technical idea of the present disclosure.

It should be understood that the term "at least one" includes all combinations related with any one item. For example, "at least one among a first element, a second element, and a third element" may include all combinations of two or more elements selected from among the first, second, and third elements as well as each element of the first, second, and third elements.

Features of various embodiments of the present disclosure may be partially or completely coupled to or combined with each other, and may be variously inter-operated with each other and driven technically as will be easily understood by those skilled in the art. The embodiments of the present disclosure may be carried out independently from each other, or may be carried out together in an interrelated manner.

Figure 2:
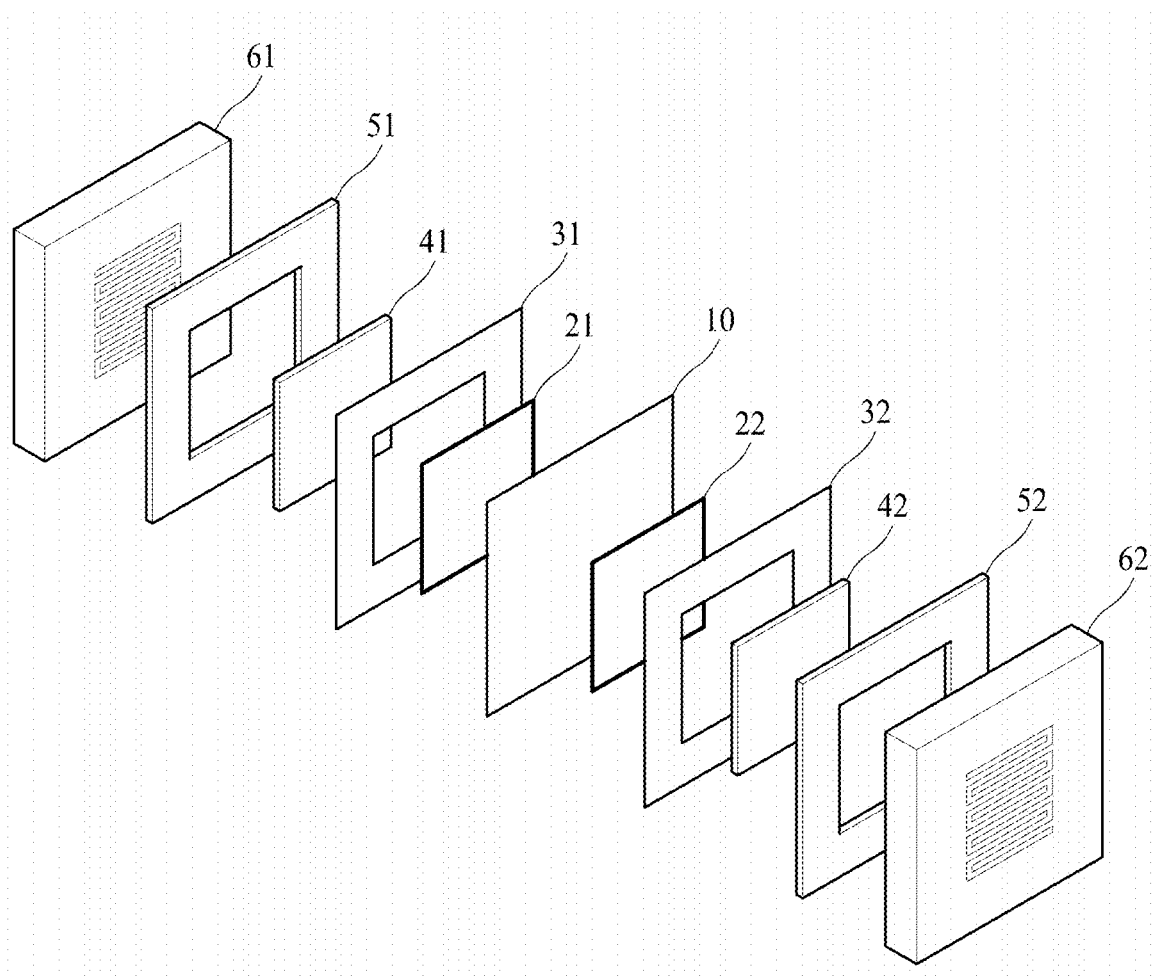
FIG. 2 is an exploded perspective view of a fuel cell.

FIG. 2 is an exploded perspective view of a fuel cell.

According to an embodiment of the present disclosure, the fuel cell includes an electrolyte membrane 10, a first electrode 21, a second electrode 22, sub-gaskets 31 and 32, gas diffusion layers 41 and 42, gaskets 51 and 52, and separators 61 and 62. FIG. 2 shows a unit cell of the fuel cell.

A polymer electrolyte membrane well-known in the art to which the present disclosure pertains may be used as the electrolyte membrane 10. A detailed description of the electrolyte membrane 10 and the polymer electrolyte membrane will be omitted.

One of the first electrode 21 and the second electrode 22 may be an oxidation electrode, and the other may be a reduction electrode. The oxidation electrode may also be referred to as an anode or a fuel electrode, and the reduction electrode may also be referred to as a cathode or an air electrode.

According to an embodiment of the present disclosure, in the case in which the first electrode 21 is an oxidation electrode, the second electrode 22 is a reduction electrode, and in the case in which the first electrode 21 is a reduction electrode, the second electrode 22 is an oxidation electrode.

Fuel such as hydrogen gas is supplied to one of the first electrode 21 and the second electrode 22, and air including oxygen is supplied to the other. Each of hydrogen gas and air is supplied to a corresponding one of the first electrode 21 and the second electrode 22 via a corresponding one of the gas diffusion layers 41 and 42.

When fuel such as hydrogen gas is supplied to the oxidation electrode, hydrogen ions ($H^+$) and electrons ($e^-$) are generated at the oxidation electrode as the result of the oxidation reaction of hydrogen. The generated hydrogen ions are transferred to the reduction electrode via the polymer electrolyte membrane 10, and the generated electrons are transferred to the reduction electrode via an external circuit. Air including oxygen is supplied to the reduction electrode, and the oxygen is bonded with the hydrogen ions and the electrons at the reduction electrode, whereby water is generated together with heat.

In the case in which hydrogen to be introduced to the oxidation electrode and air (oxygen) to be introduced to the reduction electrode move to opposite electrodes as the result of penetration, performance of the fuel cell is deteriorated. In order to prevent hydrogen and air (oxygen) from penetrating the electrolyte membrane 10 toward opposite electrodes, therefore, the sub-gaskets 31 and 32 are disposed.

The sub-gaskets 31 and 32 are disposed at the edge of the electrolyte membrane 10 in order to prevent hydrogen from being introduced to the reduction electrode not via the oxidation electrode and to prevent oxygen from being introduced to the oxidation electrode via the electrolyte membrane 10.

The gaskets 51 and 52 serve to seal spaces defined between the electrolyte membrane 10 and the separators 61 and 62 such that the supplied gas is transferred to the first electrode 21 and the second electrode 22, at which electrochemical reactions occur, without loss. Airtightness of a fuel cell stack may be maintained by the gaskets 51 and 52.

The separators 61 and 62 fix the electrolyte membrane 10, the first electrode 21, the second electrode 22, the sub-gaskets 31 and 32, the gas diffusion layers 41 and 42, and the gaskets 51 and 52. The separators 61 and 62 may also be referred to as bipolar plates.

Figure 3:
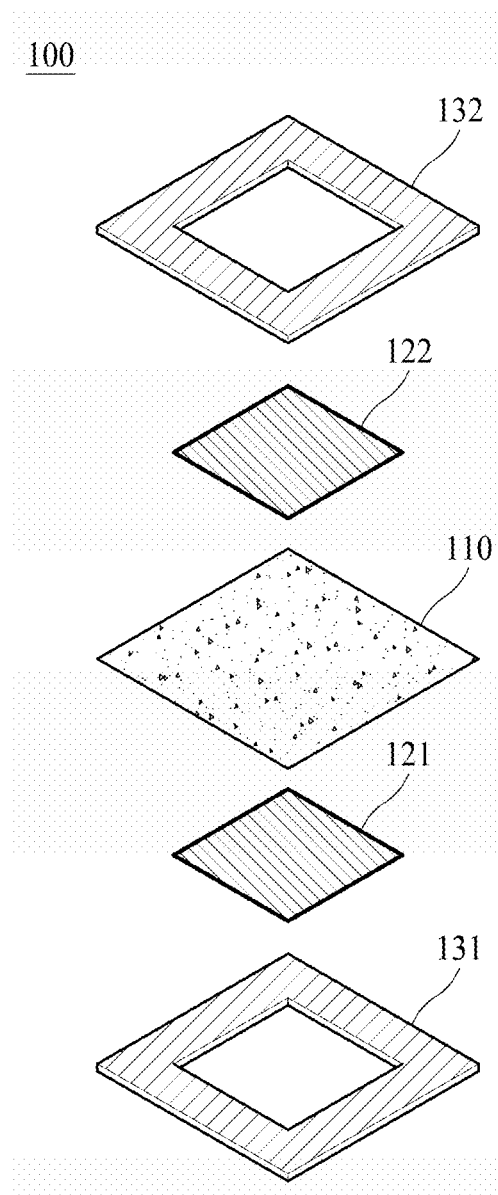
FIG. 3 is an exploded perspective view of a membrane-electrode assembly according to an embodiment of the present disclosure.
Figure 4A:
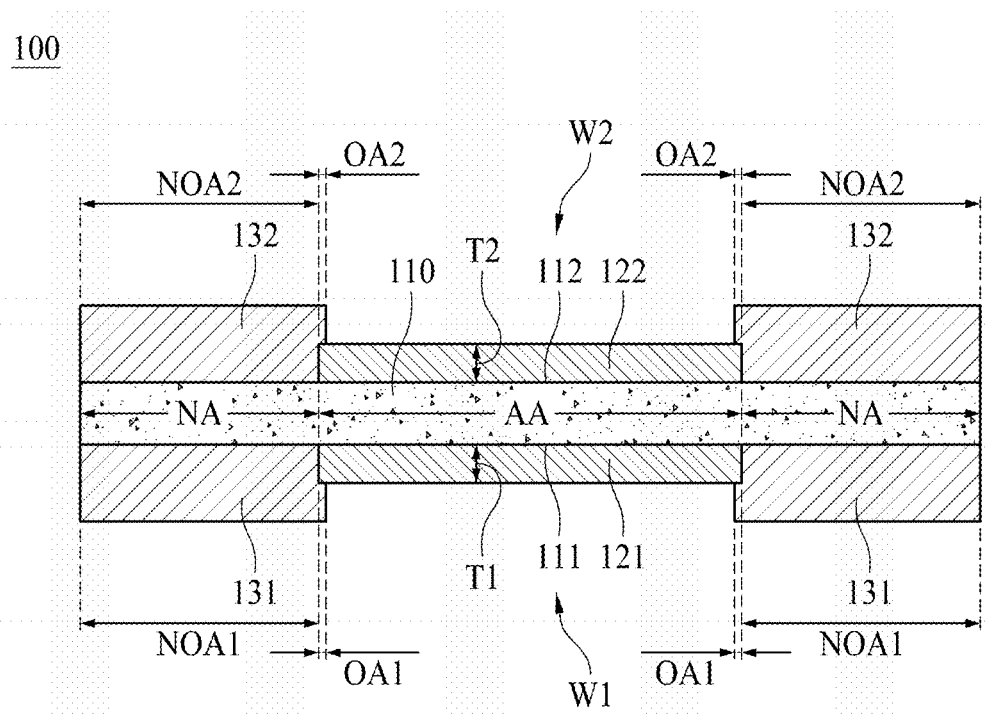
FIG. 4a is a sectional view of the membrane-electrode assembly according to the embodiment of the present disclosure.
Figure 4B:
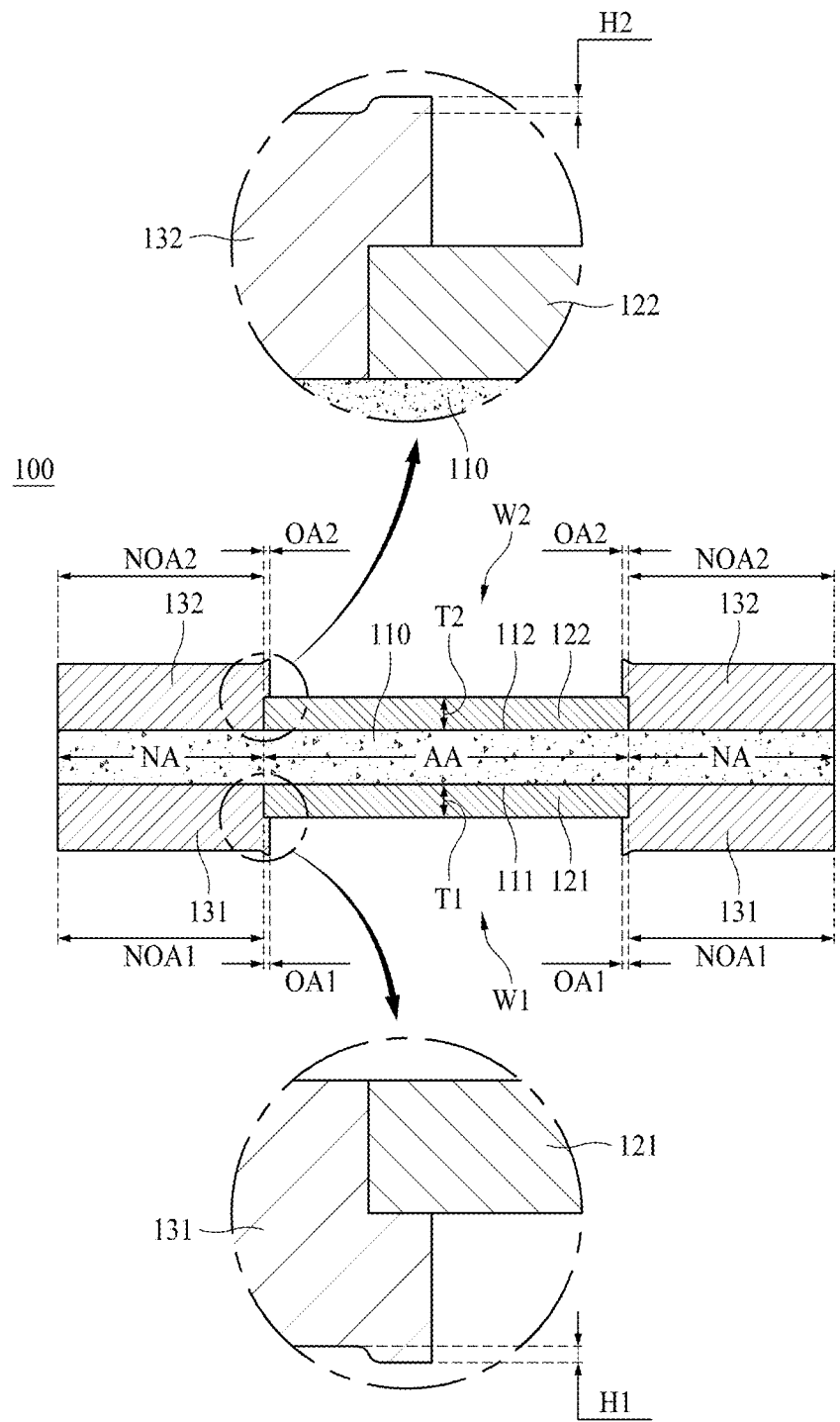
FIG. 4b is a sectional view of a membrane-electrode assembly according to another embodiment of the present disclosure.

FIG. 3 is an exploded perspective view of a membrane-electrode assembly 100 according to an embodiment of the present disclosure, and FIGS. 4a and 4b are sectional views of the membrane-electrode assemblies 100 according to different embodiments of the present disclosure.

Referring to FIGS. 4a and 4b, a sub-gasket integrated membrane-electrode assembly 100 according to an embodiment of the present disclosure includes an electrolyte membrane 110 having a first surface 111 and a second surface 112 opposite to the first surface, a first electrode 121 over the first surface 111 of the electrolyte membrane 110, a first sub-gasket 131 over the first surface 111 of the electrolyte membrane 110, a second electrode 122 over the second surface 112 of the electrolyte membrane 110, and a second sub-gasket 132 over the second surface 112 of the electrolyte membrane 110.

The electrolyte membrane 110 includes an active area AA corresponding to the first and second electrodes 121 and 122, the active area being an area that directly contributes to the generation of electricity, and a non-active area NA surrounding the active area AA. A polymer electrolyte membrane well-known in the art to which the present disclosure pertains is used as the electrolyte membrane 110. A detailed description of the polymer electrolyte membrane will be omitted.

The first electrode 121 is disposed on the first surface 111 of the electrolyte membrane 110 so as to cover the active area AA, and the second electrode 122 is disposed on the second surface 112 of the electrolyte membrane 110 so as to cover the active area AA.

One of the first electrode 121 and the second electrode 122 is an oxidation electrode, and the other is a reduction electrode. The oxidation electrode is also referred to as an anode or a fuel electrode, and the reduction electrode is also referred to as a cathode or an air electrode.

In the case in which the first electrode 121 is an oxidation electrode, the second electrode 122 is a reduction electrode, and in the case in which the first electrode 121 is a reduction electrode, the second electrode 122 is an oxidation electrode. Fuel such as hydrogen gas is supplied to one of the first electrode 121 and the second electrode 122, and air including oxygen is supplied to the other.

The first sub-gasket 131 disposed on the first surface 111 of the electrolyte membrane 110 has a first window W1 to expose the central part of the first electrode 121, and the second sub-gasket 132 disposed on the second surface 112 of the electrolyte membrane 110 has a second window W2 to expose the central part of the second electrode 122. Hydrogen gas and oxygen gas come into contact with the central parts of the first and second electrodes 121 and 122, which are exposed through the first and second windows W1 and W2, respectively.

The first sub-gasket 131 and the second sub-gasket 132 are elastic and airtight. Each of the first sub-gasket 131 and the second sub-gasket 132 prevents hydrogen or oxygen introduced into one electrode from being introduced into the other electrode via the electrolyte membrane 110.

Each of the first sub-gasket 131 and the second sub-gasket 132 may be made of an elastic material. Each of the first sub-gasket 131 and the second sub-gasket 132 may include at least one selected from the group consisting of polyethylene terephthalate (PET), polyamide, tetrafluoroethylene/hexafluoropropylene (FEP), fluorine rubber, silicone rubber, hydrocarbon-based elastomer (EPDM, EPR, etc.), and polyurethane.

As illustrated in FIGS. 4a and 4b, the first sub-gasket 131 includes a first overlap area OA1 overlapping the edge of the first electrode 121 and a first non-overlap area NOA1 covering the non-active area NA of the electrolyte membrane 110.

In the same manner, the second sub-gasket 132 includes a second overlap area OA2 overlapping the edge of the second electrode 122 and a second non-overlap area NOA2 covering the non-active area NA of the electrolyte membrane 110.

The first and second overlap areas OA1 and OA2 of the first and second sub-gaskets 131 and 132 not only protect the edges of the first and second electrodes 121 and 122 and but also prevent gas from leaking through the boundary between the first sub-gasket 131 and the first electrode 121 or the boundary between the second sub-gasket 132 and the second electrode 122.

According to the present disclosure, (i) there is no step between the first overlap area OA1 and the first non-overlap area NOA1 and between the second overlap area OA2 and the second non-overlap area NOA2, as shown in FIG. 4a, or (ii) as shown in FIG. 4b, the height H1 of a first step formed by the first overlap area OA1 and the first non-overlap area NOA1 is 0.5 times or less, more preferably 0.2 times or less, the thickness T1 of the first electrode 121 and the height H2 of a second step formed by the second overlap area OA2 and the second non-overlap area NOA2 is 0.5 times or less, more preferably 0.2 times or less, the thickness T2 of the second electrode 122.

That is, according to the present disclosure, no step is formed at the upper surface of each of the first and second sub-gaskets 131 and 132, or, even though a step is formed, the height of the step is so small that it is 0.5 times or less, more preferably 0.2 times or less, the thickness T1 or T2 of the first or second electrode 121 or 122. Consequently, workability in a subsequent process such as a process for forming/assembling a gas diffusion layer may be improved.

In addition, as illustrated FIGS. 4a and 4b, the first and second sub-gaskets 131 and 132 may be in tight contact with the first and second electrodes 121 and 122, respectively, to the extent that there are no air gaps therebetween. Consequently, it is possible to prevent leakage of gas through air gaps.

Hereinafter, a method of manufacturing a membrane-electrode assembly 100 according to an embodiment of the present disclosure will be described with reference to FIGS. 5a to 5h.

FIGS. 5a to 5h are views showing a process of manufacturing a membrane-electrode assembly 100 according to an embodiment of the present disclosure.

Figure 5A:
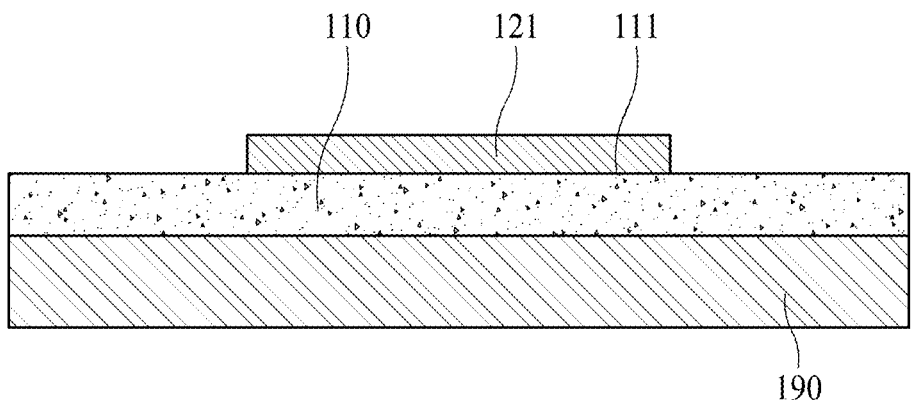
FIGS. 5a to 5h are views showing a process of manufacturing a membrane-electrode assembly according to an embodiment of the present disclosure.

Referring first to FIG. 5a, a first electrode 121 is formed over a first surface 111 of an electrolyte membrane 110.

A method of forming the first electrode 121 is not particularly restricted. According to an embodiment of the present disclosure, the first electrode 121 may be formed using a coating method or a transfer method. At least one of an oxidation electrode material and a reduction electrode material well-known in the art to which the present disclosure pertains may be used as the material for the first electrode 121.

In the step of forming the first electrode 121, the electrolyte membrane 110 may be supported by a support substrate 190. The kind of the support substrate 190 is not particularly restricted. Any material capable of supporting the electrolyte membrane 110 may be used for the support substrate 190. For example, a plastic film may be used as the support substrate 190. According to an embodiment of the present disclosure, a polyethylene terephthalate (PET) film may be used as the support substrate 190.

Figure 5B:
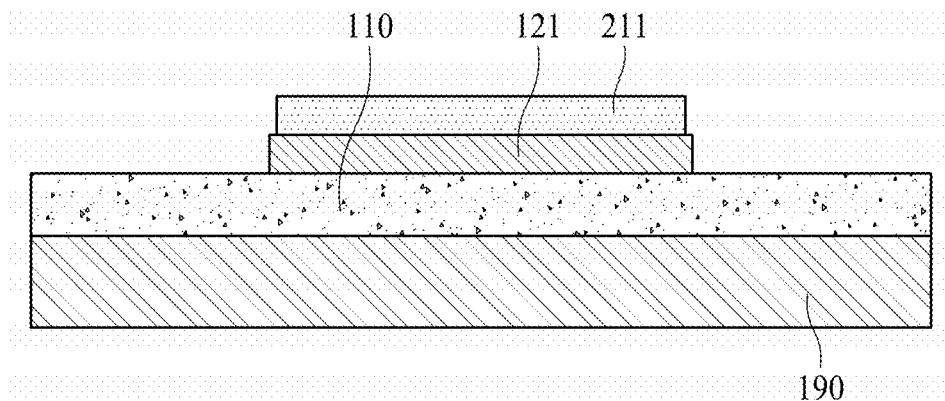

Referring to FIG. 5b, a first passivation layer 211 is disposed over the first electrode 121.

The first passivation layer 211 protects the first electrode 121. The first passivation layer 211 may be removed after the coating to form a first sub-gasket 131, or may remain attached to the first electrode 121 until a second sub-gasket 132 is formed and then removed together with a second passivation layer 212 after the second sub-gasket 132 is formed. Thus, the first passivation layer 211 is made of a material capable of minimizing damage to the first electrode 121 during the peeling process.

For example, at least one selected from the group consisting of polyethylene terephthalate (PET), polyimide (PI), tetrafluoroethylene, polyethylene (PE), rubber, and silicone may be used for the first passivation layer 211.

The first passivation layer 211 may have a thickness of 1 to 50 μm.

In addition, referring to FIG. 5b, the first passivation layer 211 may have a smaller area than the first electrode 121, and may be disposed within the region of the first electrode 121. More specifically, the first passivation layer 211 may be disposed inside the edge of the first electrode 121. Consequently, the first sub-gasket 131 can be disposed over the edge of the first electrode 121.

Figure 5C:
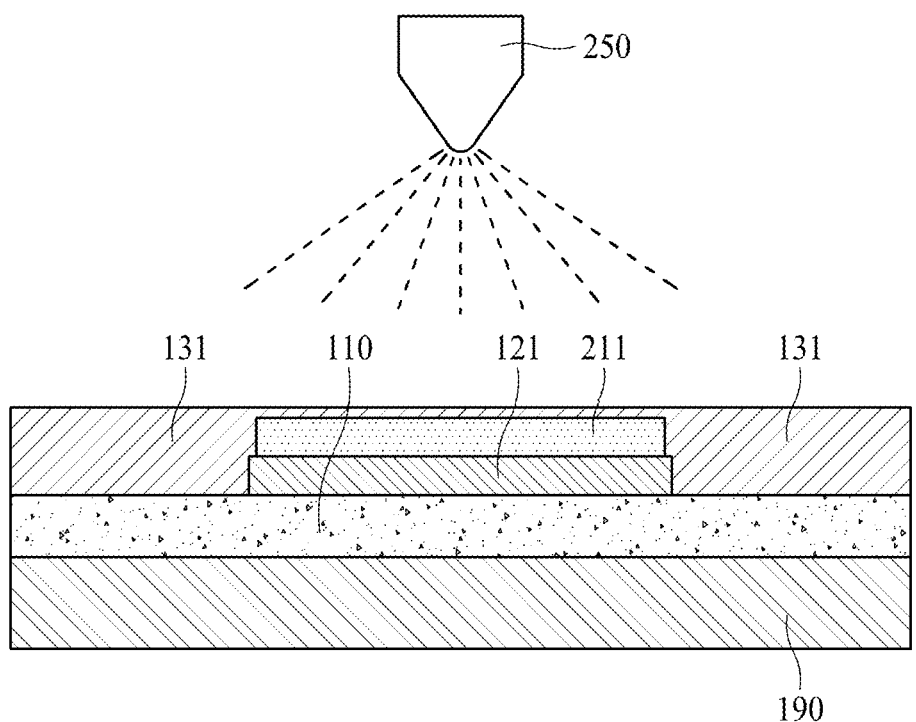

Referring to FIG. 5c, a first sub-gasket 131 is formed over the first surface 111 of the electrolyte membrane 110 by coating a first liquid material.

The first liquid material for forming the first sub-gasket 131 may include an elastic material that is crosslinkable or curable.

Specifically, the first sub-gasket 131 may include at least one selected from the group consisting of polyethylene terephthalate (PET), polyamide, tetrafluoroethylene/hexafluoropropylene (FEP), fluorine rubber, silicone rubber, hydrocarbon-based elastomer (EPDM, EPR, etc.), and polyurethane. Consequently, the first liquid material may be a material including any one selected from the group consisting of polyethylene terephthalate (PET), polyamide, tetrafluoroethylene/hexafluoropropylene (FEP), fluorine rubber, silicone rubber, hydrocarbon-based elastomer (EPDM, EPR, etc.), and polyurethane, which is dissolved or dispersed in a solvent. In this way, the first liquid material may include a polymer component.

According to an embodiment of the present disclosure, the first sub-gasket 131 may be formed by means of a direct coating method using a liquid material.

Specifically, any one selected from the group consisting of spray coating, comma coating, and slot die coating, each of which uses a liquid material, may be used to form the first sub-gasket 131. For example, the first sub-gasket 131 may be formed by spray coating.

A method of forming the first sub-gasket 131 by spray coating is shown in FIG. 5c. As described above, according to an embodiment of the present disclosure, a direct coating method using a liquid material may be used as a coating method for forming the first sub-gasket 131. Referring to FIG. 5c, a spray coating apparatus 250 is used to perform the spray coating.

After coating, the first liquid material is dried and crosslinked or cured, whereby the first sub-gasket 131 is completed.

In the step of forming the first sub-gasket 131, the first sub-gasket 131 may be left for 10 to 600 seconds after the coating. In this way, the first liquid material used to form the first sub-gasket 131 may be dried, and the polymer component included in the first liquid material may be crosslinked or cured.

Further, in the step of forming the first sub-gasket 131, the first sub-gasket 131 may be heated at a temperature of 40 to 150° C. after the coating using the first liquid material. As a result of the heating, thermal crosslinking or thermal curing of the polymer component included in the first liquid material may be accelerated such that the first sub-gasket 131 is completed.

According to an embodiment of the present disclosure, in the step of forming the first sub-gasket 131, the first sub-gasket 131 may be thermally treated using hot air for 3 to 300 seconds after the coating using the first liquid material.

Figure 5D:
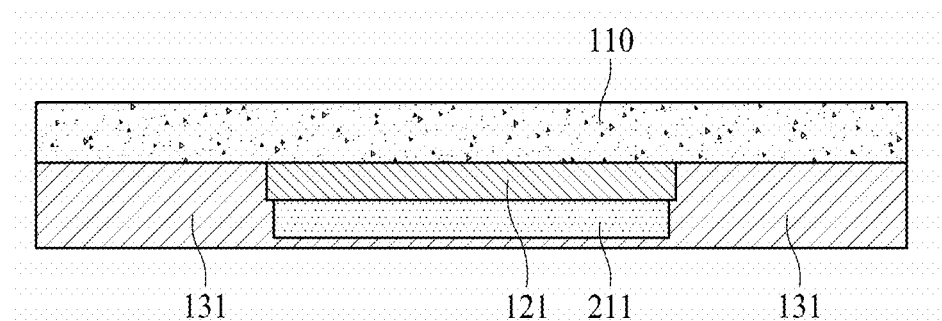

Referring to FIG. 5d, the electrolyte membrane 110 is separated from the support substrate 190, and then the electrolyte membrane 110 is turned upside down such that the second surface 112 of the electrolyte membrane 110 faces upwards.

Figure 5E:
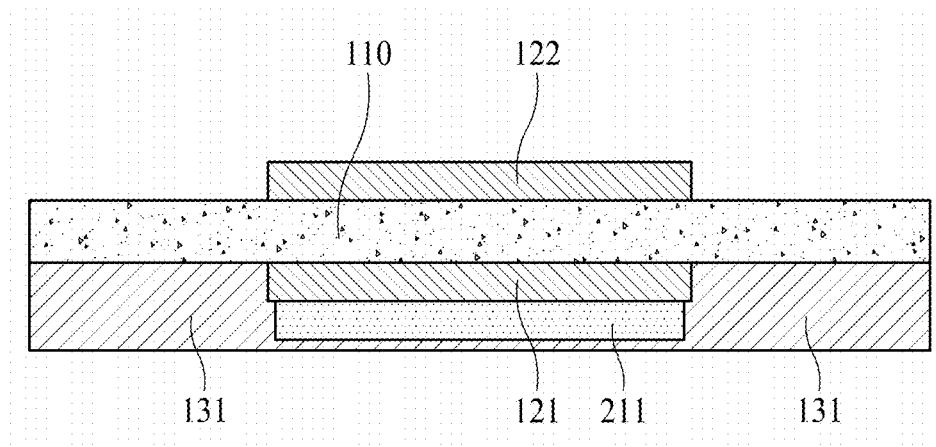

Referring to FIG. 5e, a second electrode 122 is formed over the second surface 112 of the electrolyte membrane 110.

The second electrode 122 may be formed using the same method as in the first electrode 121. According to an embodiment of the present disclosure, the second electrode 122 may be formed using a coating method or a transfer method. In the case in which the first electrode 121 is an oxidation electrode, the second electrode 122 is a reduction electrode, and in the case in which the first electrode 121 is a reduction electrode, the second electrode 122 is an oxidation electrode. At least one of a reduction electrode material and an oxidation electrode material well-known in the art to which the present disclosure pertains may be used as the material for the second electrode 122.

Figure 5F:
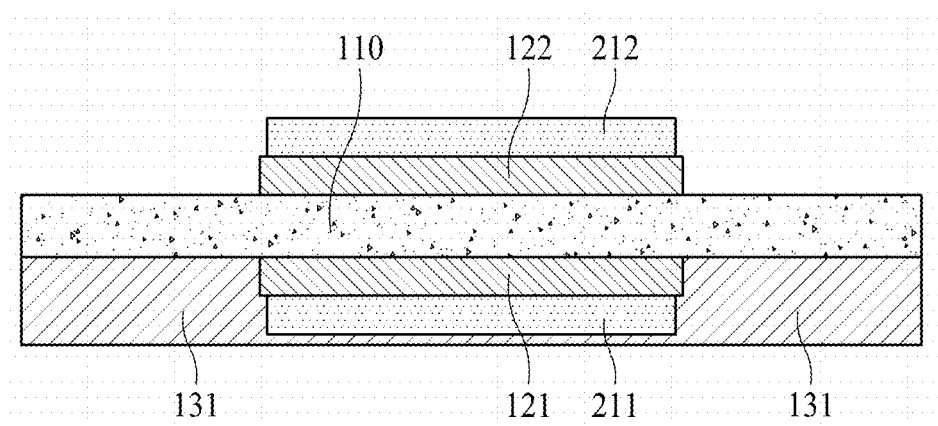

Referring to FIG. 5f, a second passivation layer 212 is disposed over the second electrode 122.

The second passivation layer 212 protects the second electrode 122. The second passivation layer 212 is removed after the coating to form a second sub-gasket 132. Thus, the second passivation layer 212 is made of a material capable of minimizing damage to the second electrode 122 during the peeling process.

The second passivation layer 212 may be made of the same material as the first passivation layer 211.

For example, at least one selected from the group consisting of polyethylene terephthalate (PET), polyimide (P tetrafluoroethylene, polyethylene (PE), rubber, and silicone may be used for the second passivation layer 212. The first passivation layer 122 may have a thickness of 1 to 50 µm.

Referring to FIG. 5f, the second passivation layer 212 may have a smaller area than the second electrode 122, and may be disposed within the region of the second electrode 122. More specifically, the second passivation layer 212 may be disposed inside the edge of the second electrode 122. Consequently, the second sub-gasket 132 can be disposed over the edge of the second electrode 122.

Figure 5G:
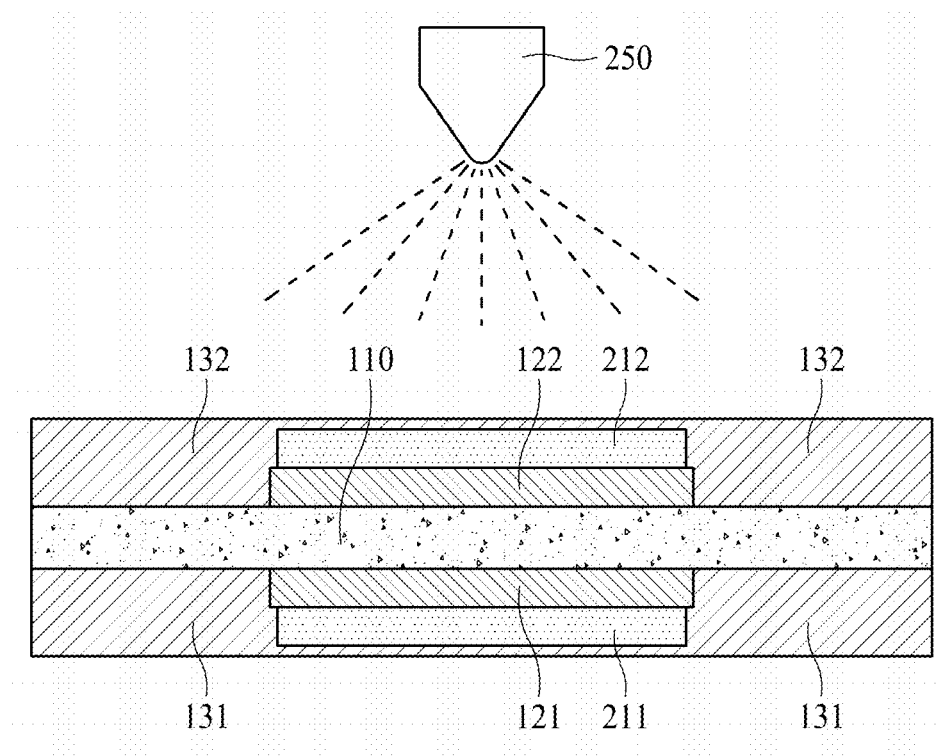

Referring to FIG. 5g, a second sub-gasket 132 is formed over the second surface 112 of the electrolyte membrane 110 by coating a second liquid material.

The second liquid material to form the second sub-gasket 132 may be identical to or different from the first liquid material to form the first sub-gasket 131.

According to an embodiment of the present disclosure, the first liquid material and the second liquid material may have the same composition.

On the other hand, different additives may be added to the first liquid material and the second liquid material depending on the regions to which the liquid materials are applied or purposes for which the liquid materials are used, whereby compositions thereof may be different from each other. As a result, the first sub-gasket 131 and the second sub-gasket 132 may have different functionalities.

The second liquid material to form the second sub-gasket 132 may be an elastic material that is crosslinkable or curable.

Specifically, the second sub-gasket 132 may include at least one selected from the group consisting of polyethylene terephthalate (PET), polyamide, tetrafluoroethylene/hexafluoropropylene (FEP), fluorine rubber, silicone rubber, hydrocarbon-based elastomer (EPDM, EPR, etc.), and polyurethane. In other words, the second liquid material may be a material including any one selected from the group consisting of polyethylene terephthalate (PET), polyamide, tetrafluoroethylene/hexafluoropropylene (FEP), fluorine rubber, silicone rubber, hydrocarbon-based elastomer (EPDM, EPR, etc.), and polyurethane, which is dissolved or dispersed in a solvent. In this way, the second liquid material may include a polymer component. According to an embodiment of the present disclosure, the second sub-gasket 132 may be formed by means of a direct coating method using a liquid material.

Specifically, any one selected from the group consisting of spray coating, comma coating, and slot die coating, each of which uses a liquid material, may be used as the coating method to form the second sub-gasket 132. For example, the second sub-gasket 132 may be formed by spray coating.

A method of forming the second sub-gasket 132 by spray coating is shown in FIG. 5g. As described above, according to an embodiment of the present disclosure, a direct coating method using a liquid material may be used to form the second sub-gasket 132. Typically, spray coating may be used.

After coating, the second liquid material is dried and crosslinked or cured, whereby the second sub-gasket 132 is completed.

In the step of forming the second sub-gasket 132, the second sub-gasket 132 may be left for 10 to 600 seconds after coating. As a result, the second liquid material to form the second sub-gasket 132 may be dried, and the polymer component included in the second liquid material may be crosslinked or cured.

Further, in the step of forming the second sub-gasket 132, the second sub-gasket 131 may be heated at a temperature of 40 to 150° C. after the coating using the second liquid material. As a result of the heating, thermal crosslinking or thermal curing of the polymer component included in the second liquid material may be accelerated, whereby the second sub-gasket 131 may be completed.

According to an embodiment of the present disclosure, in the step of forming the second sub-gasket 131, the second sub-gasket 131 may be thermally treated using hot air for 3 to 300 seconds after the coating using the second liquid material.

The first sub-gasket 131 and the second sub-gasket 132 may be heated simultaneously or individually.

However, the present disclosure is not limited thereto. Heating may or may not be performed depending on the materials.

Figure 5H:
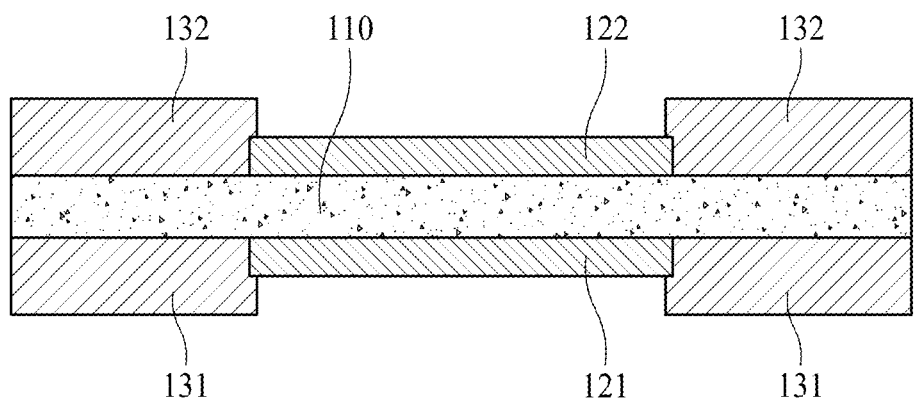

Referring to FIG. 5h, the first passivation layer 211 and the second passivation layer 212 are removed. When the first passivation layer 211 and the second passivation layer 212 are removed, the coating layer made of the first liquid material remaining on the first passivation layer 211 and the coating layer made of the second liquid material remaining on the second passivation layer 212 are also removed.

As a result of the removal of the first and second passivation layers 211 and 212, the first electrode 121 and the second electrode 122 are exposed, and a membrane-electrode assembly 100 according to an embodiment of the present disclosure is completed. Referring to FIG. 5h, the surface of the first electrode 121 opposite to the electrolyte membrane 110 is exposed, and the surface of the second electrode 122 opposite to the electrolyte membrane 110 is exposed.

Figure 6:
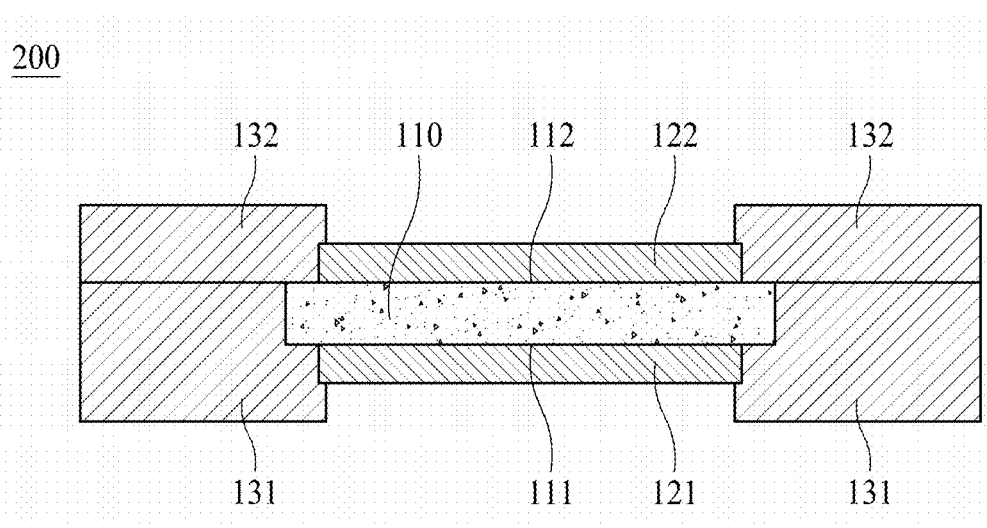
FIG. 6 is a sectional view of a membrane-electrode assembly according to another embodiment of the present disclosure.

FIG. 6 is a sectional view of a membrane-electrode assembly 200 according to another embodiment of the present disclosure.

The membrane-electrode assembly 200 shown in FIG. 6 is different from the membrane-electrode assemblies shown in FIGS. 4A and 4B in that the entire edge of an electrolyte membrane 110 is surrounded by first and second sub-gaskets 131 and 132.

Compared to the membrane-electrode assemblies 100 shown in FIGS. 4A and 4B in which the electrolyte membrane 110 has the same size as the first sub-gasket 131 or the second sub-gasket 132, the edge of the electrolyte membrane 110 of the sub-gasket integrated membrane-electrode assembly 200 illustrated in FIG. 6 can be more stably protected, and the electrolyte membrane 110, which is generally expensive, may be used in a smaller amount, which makes this embodiment more economical.

FIGS. 7a to 7h are views showing a process of manufacturing a membrane-electrode assembly 200 according to the other embodiment of the present disclosure.

A method of manufacturing a membrane-electrode assembly 200 according to another embodiment of the present disclosure further includes cutting at least a portion of an electrolyte membrane 110 before forming the first sub-gasket 131.

Hereinafter, the method of manufacturing the membrane-electrode assembly 200 according to the other embodiment of the present disclosure will be described with reference to FIGS. 7a to 7h.

Figure 7A:
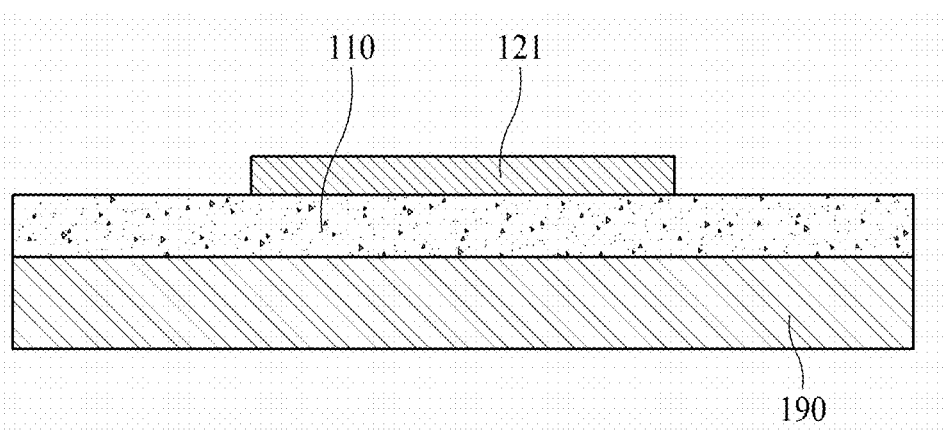
FIGS. 7a to 7h are views showing a process of manufacturing a membrane-electrode assembly according to another embodiment of the present disclosure.

Referring first to FIG. 7a, a first electrode 121 is formed over a first surface 111 of an electrolyte membrane 110. A method of forming the first electrode 121 is not particularly restricted. The first electrode 121 may be formed using a coating or transfer method.

Figure 7B:
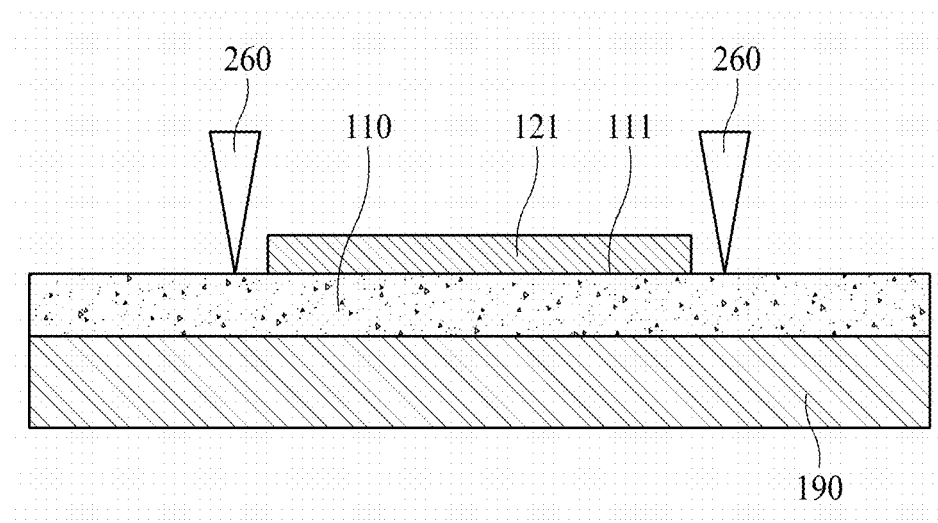

Referring to FIG. 7b, the edge of the electrolyte membrane 110 is cut. At this time, a cutter 260 or a pinnacle die may be used. As a result, the electrolyte membrane 110 has a smaller area than a support substrate 190.

Figure 7C:
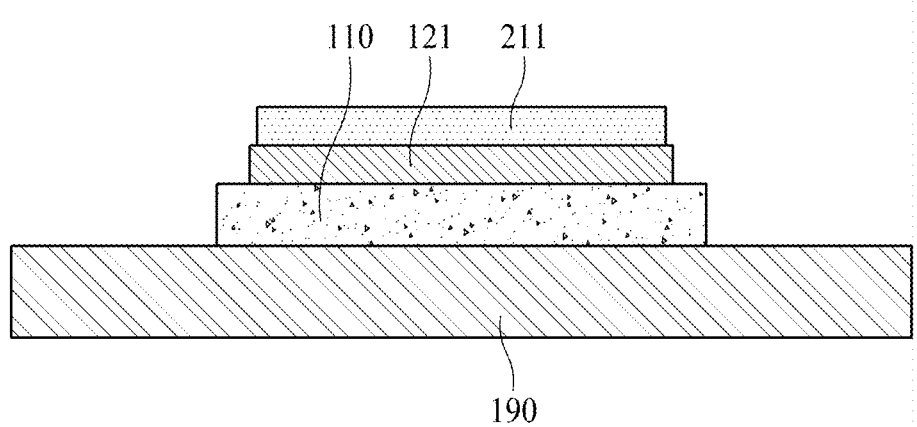

Referring to FIG. 7c, a first passivation layer 211 is disposed over the first electrode 121. The first passivation layer 211 protects the first electrode 121 when a subsequent coating process is performed.

Figure 7D:
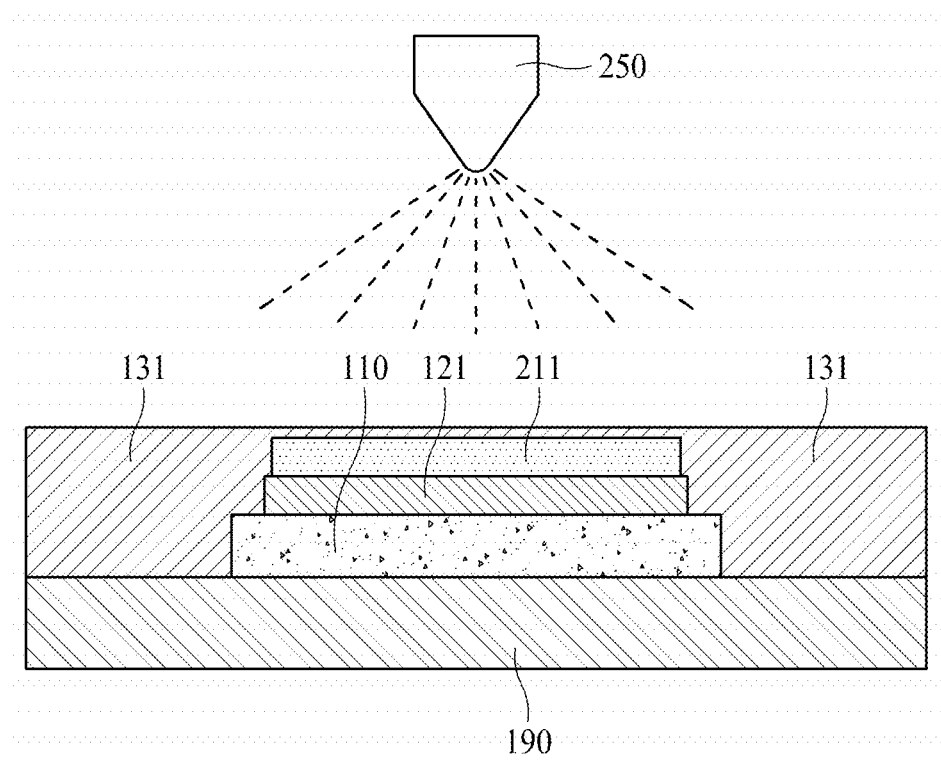

Referring to FIG. 7d, a first sub-gasket 131 is formed over the first surface 111 of the electrolyte membrane 110 by coating a first liquid material. The first sub-gasket 131 completely surrounds the first surface 111 and the side surface of the electrolyte membrane 110.

Referring to FIG. 7d, the first sub-gasket 131 may be formed by spray coating, which is a kind of direct coating using a liquid material. After coating, the first liquid material is dried and crosslinked or cured.

Figure 7E:
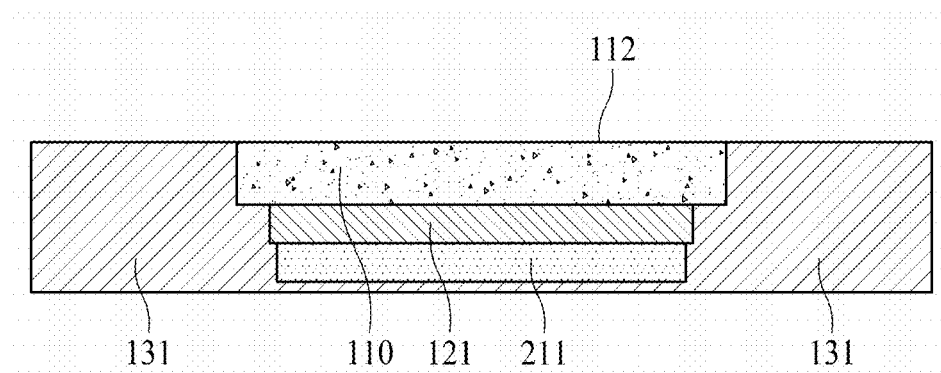

Referring to FIG. 7e, the electrolyte membrane 110 is separated from the support substrate 190, and then the electrolyte membrane 110 is turned upside down such that a second surface 112 of the electrolyte membrane 110 faces upwards.

Figure 7F:
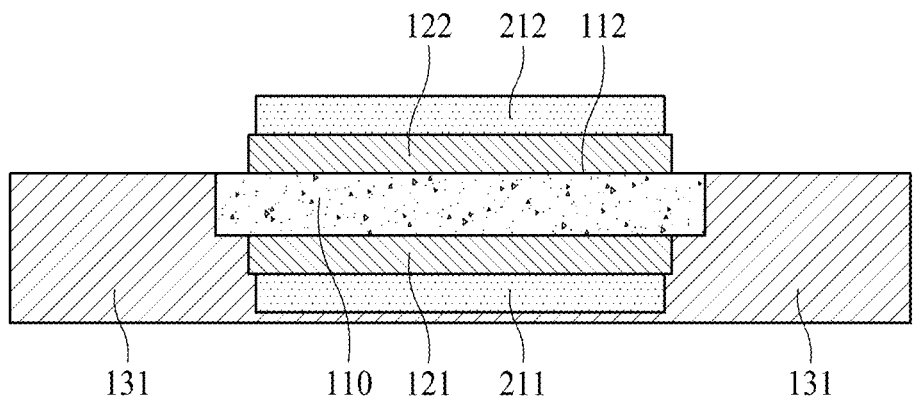

Referring to FIG. 7f, a second electrode 122 is formed over the second surface 112 of the electrolyte membrane 110, and a second passivation layer 212 is disposed over the second electrode 122. The second passivation layer 212 protects the second electrode 122.

Figure 7G:
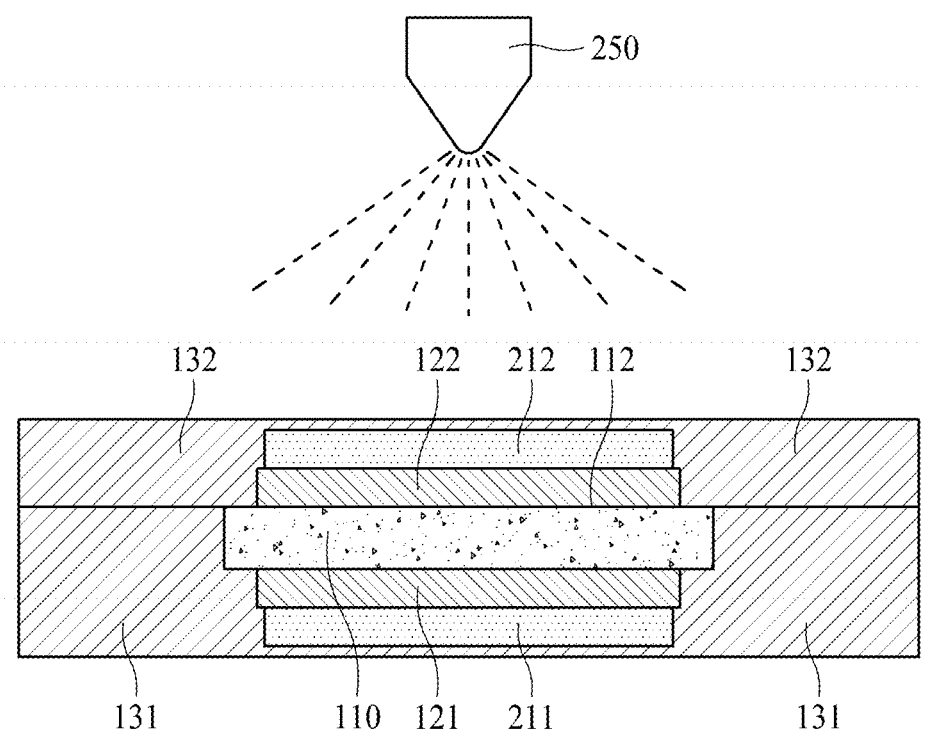

Referring to FIG. 7g, a second sub-gasket 132 is formed over the second surface 112 of the electrolyte membrane 110 and over the first sub-gasket 131 by coating a second liquid material.

The second liquid material to form the second sub-gasket 132 may be identical to or different from the first liquid material to form the first sub-gasket 131. Referring to FIG. 7g, the second sub-gasket 132 may be formed by spray coating. According to an embodiment of the present disclosure, therefore, a direct coating method using a liquid material may be used as the coating method to form the second sub-gasket 132. For example, spray coating may be used.

After coating, the second liquid material may be dried and crosslinked or cured.

Figure 7H:
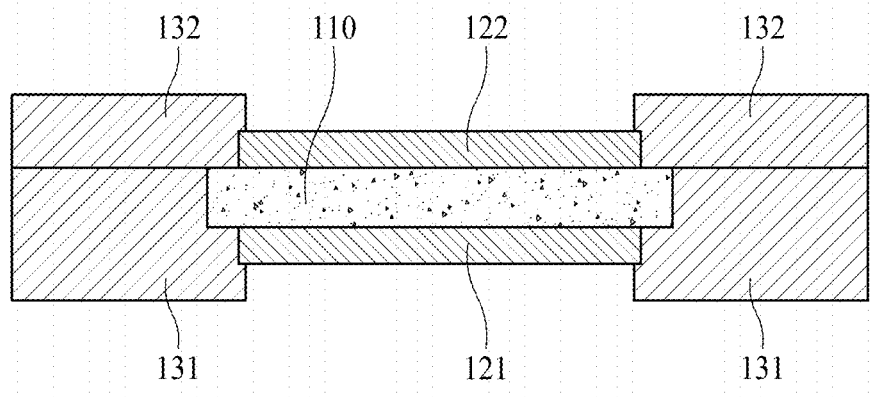

Referring to FIG. 7h, the first passivation layer 211 and the second passivation layer 212 are removed. When the first passivation layer 211 and the second passivation layer 212 are removed, the coating layer made of the first liquid material remaining on the first passivation layer 211 and the coating layer made of the second liquid material remaining on the second passivation layer 212 are also removed. The removal of the first and second passivation layers 211 and 212 exposes the first and second electrodes 121 and 122, whereby the membrane-electrode assembly 200 according to the other embodiment of the present disclosure is completed.

Since the thicknesses of the sub-gaskets 131 and 132 formed by a coating method are variably adjustable and the sub-gaskets 131 and 132 are manufactured by a coating method using a liquid, it is possible to form the sub-gaskets 131 and 132 without causing an air gap, which is caused due to the steps corresponding to the thicknesses of the electrode layers when conventional film type sub-gaskets are laminated. In addition, it is possible to manufacture the sub-gaskets 131 and 132 in a flat shape, thereby achieving easy workability at the time of assembly of a gas diffusion layer (GDL).

Figure 8:
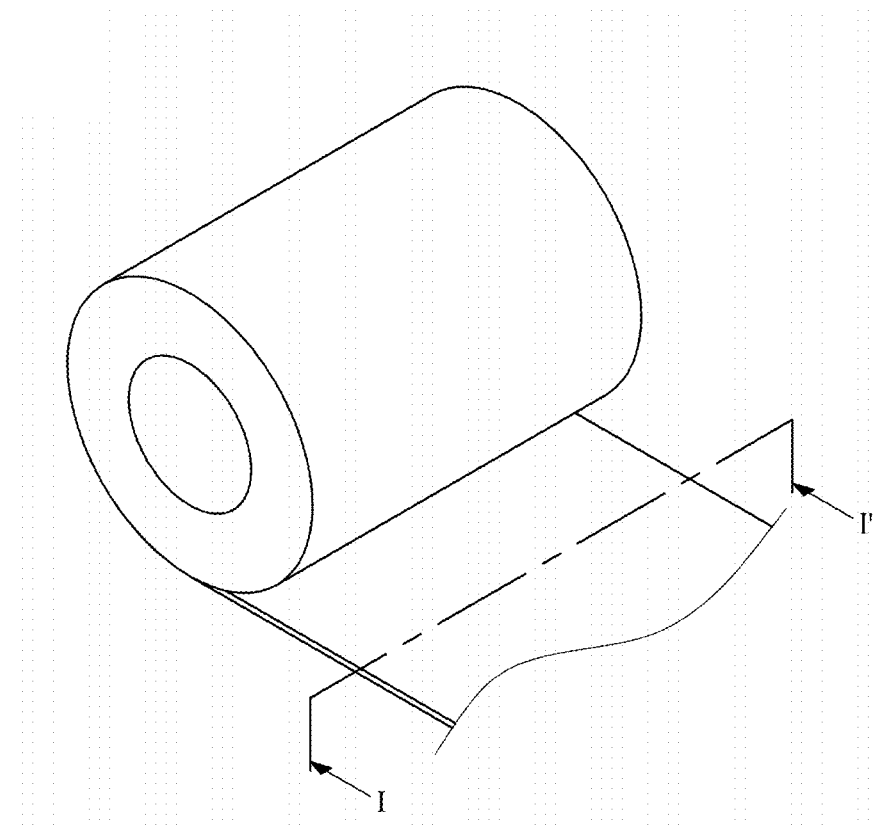
FIG. 8 is a perspective view of a membrane-electrode assembly wound in the form of a roll.

FIG. 8 is a perspective view of a membrane-electrode assembly wound in the form of a roll.

Each of the membrane-electrode assemblies 100 and 200 according to the embodiments of the present disclosure may be wound in the form of a roll, as shown in FIG. 8. A sectional view taken along line I-I' of FIG. 8 may be indicated as shown in FIG. 4A, 4B, or 6.

A direct coating according to the embodiments of the present disclosure of the material for the sub-gasket over the electrolyte membrane 110 makes it possible to manufacture the membrane-electrode assemblies 100 and 200 in a roll-to-roll manner. As a result, mass production becomes feasible.

Hereinafter, a method of manufacturing a membrane-electrode assembly according to another embodiment of the present disclosure will be described with reference to FIGS. 9a to 9f.

Figure 9A:
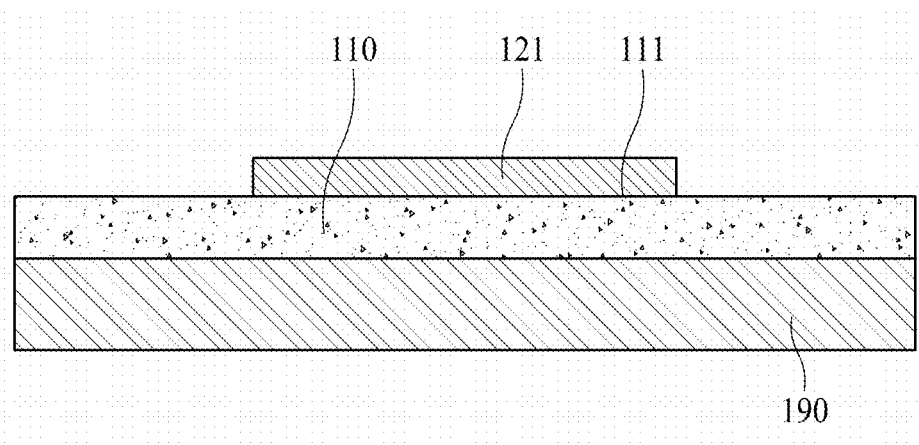
FIGS. 9a to 9f are views showing a process of manufacturing a membrane-electrode assembly according to an embodiment of the present disclosure.

Referring to FIG. 9a, a first electrode 121 is formed over a first surface 111 of an electrolyte membrane 110.

When forming the first electrode 121, the electrolyte membrane 110 may be supported by a support substrate 190.

Figure 9B:
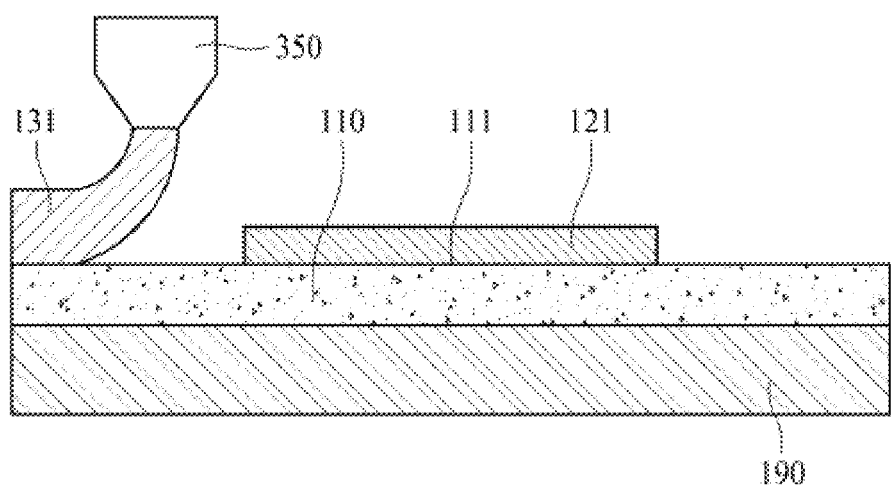

Referring to FIG. 9b, a first sub-gasket 131 is formed over the first surface 111 of the electrolyte membrane 110 by coating a first liquid material.

The first liquid material to form the first sub-gasket 131 may be an elastic material that is crosslinkable or curable.

According to another embodiment of the present disclosure, the first sub-gasket 131 may be formed by directly coating/printing the first liquid material for the first sub-gasket 131 over the electrolyte membrane 110 around the first electrode 121 without any passivation layer. For example, the first liquid material may be directly coated/printed around the first electrode 121 by means of a 3D printer or a partial coating apparatus without any passivation layer, and crosslinked. As a result, the first sub-gasket 131 is selectively formed over the electrolyte membrane 110.

A method of performing the direct coating using a 3D printer 350 is illustrated in FIG. 9b.

Figure 9C:
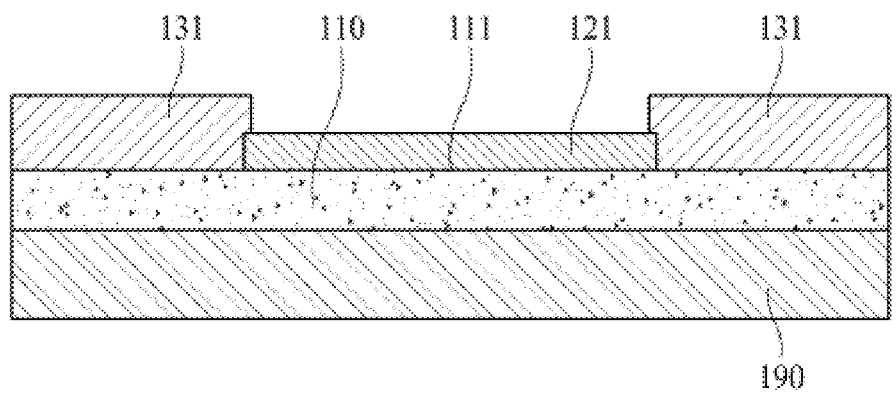

Referring to FIG. 9c, after coating/printing, the first liquid material is dried and crosslinked or cured, whereby the first sub-gasket 131 is completed.

Figure 9D:
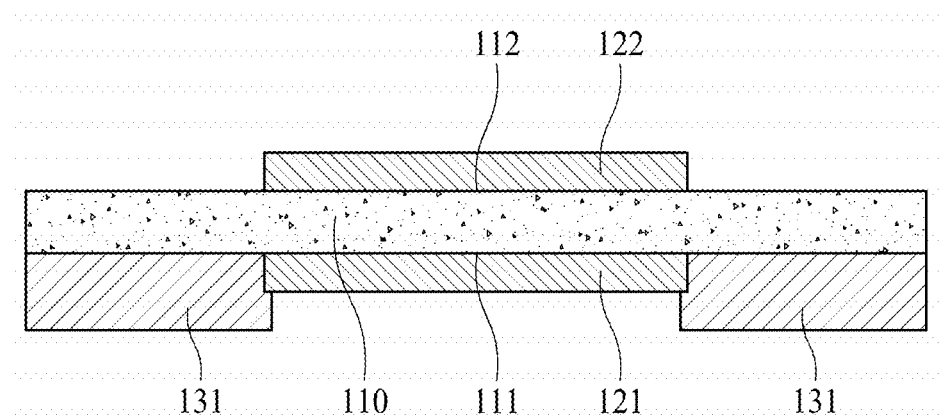

Referring to FIG. 9d, the electrolyte membrane 110 is separated from the support substrate 190, and then the electrolyte membrane 110 is turned upside down such that a second surface 112 of the electrolyte membrane 110 faces upwards. Subsequently, a second electrode 122 is formed over the second surface 112 of the electrolyte membrane 110.

The second electrode 122 may be formed using the same method as in the first electrode 121. According to an embodiment of the present disclosure, the second electrode 122 may be formed using a coating or transfer method. In the case in which the first electrode 121 is an oxidation electrode, the second electrode 122 is a reduction electrode, and in the case in which the first electrode 121 is a reduction electrode, the second electrode 122 is an oxidation electrode.

Figure 9E:
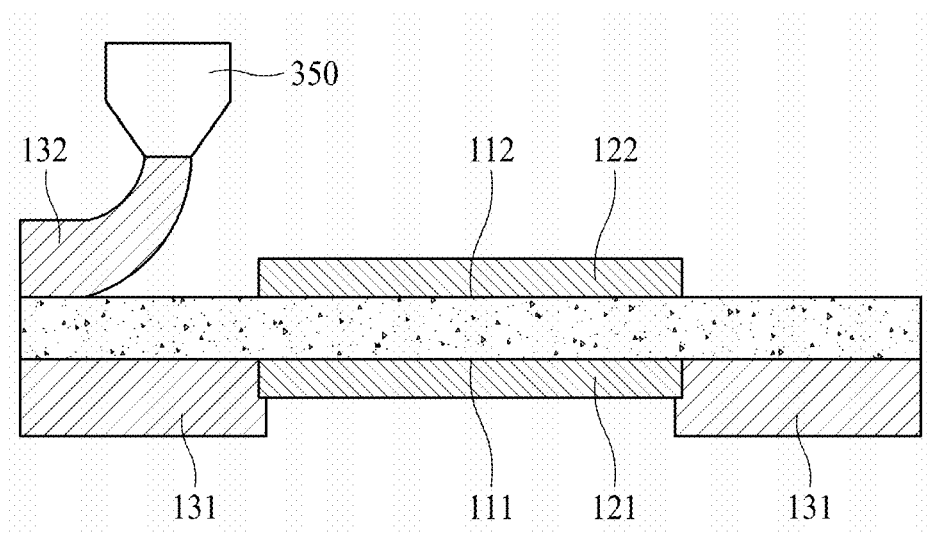

Referring to FIG. 9e, a second sub-gasket 132 is formed over the second surface 112 of the electrolyte membrane 110 by coating a second liquid material.

The second liquid material to form the second sub-gasket 132 may be an elastic material that is crosslinkable or curable. The second liquid material to form the second sub-gasket 132 may be identical to or different from the first liquid material to form the first sub-gasket 131.

According to another embodiment of the present disclosure, the second sub-gasket 132 may be formed by directly coating/printing the second liquid material for the second sub-gasket 132 over the electrolyte membrane 110 around the second electrode 122 without a passivation layer. For example, the second liquid material may be directly coated/printed around the second electrode 122 without a passivation layer using a 3D printer or a partial coating apparatus, and then crosslinked. As a result, the second sub-gasket 132 is selectively formed over the electrolyte membrane 110.

A method of performing the direct coating using a 3D printer 350 is illustrated in FIG. 9e.

Figure 9F:
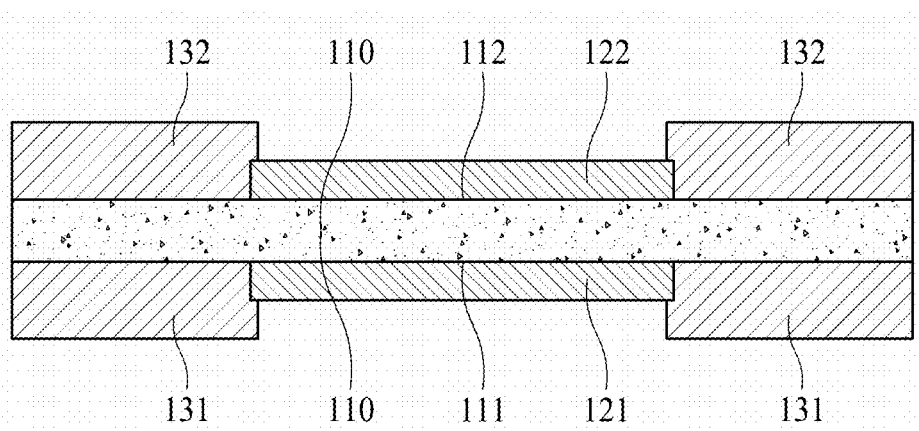

Referring to FIG. 9f, after coating/printing, the second liquid material is dried and crosslinked or cured, whereby the second sub-gasket 132 is completed. As a result, the membrane-electrode assembly according to another embodiment of the present disclosure is manufactured.

FIGS. 10a to 10h are views showing a process of manufacturing a membrane-electrode assembly according to Comparative Example 1.

A method of manufacturing a membrane-electrode assembly according to Comparative Example 1 is different from the embodiments of the present disclosure in that a catalyst coated membrane (CCM) including a first electrode 121 and a second electrode 122 already formed on an electrolyte membrane 110 is used.

Figure 10A:
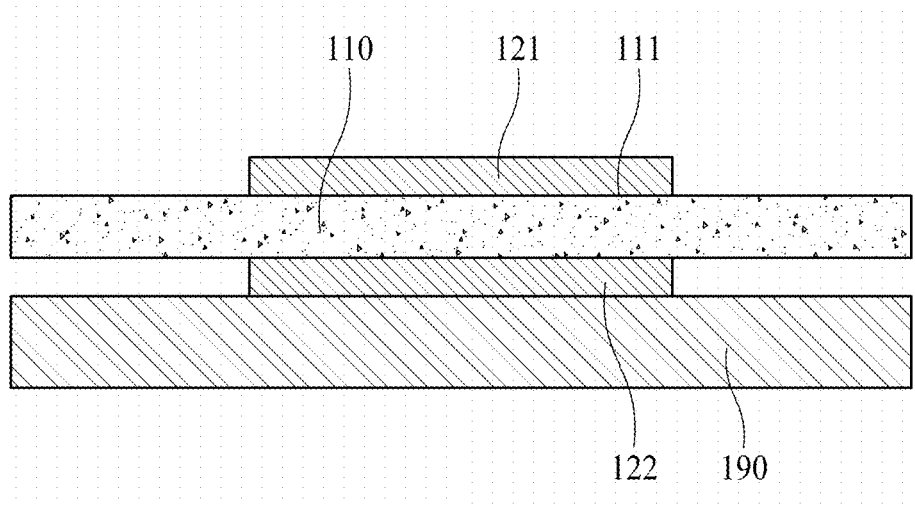
FIGS. 10a to 10h are views showing a process of manufacturing a membrane-electrode assembly according to Comparative Example 1.

Specifically, referring to FIG. 10a, a catalyst coated membrane (CCM) including a first electrode 121 and a second electrode 122 already formed on an electrolyte membrane 110 is disposed on a support substrate 190.

Figure 10B:
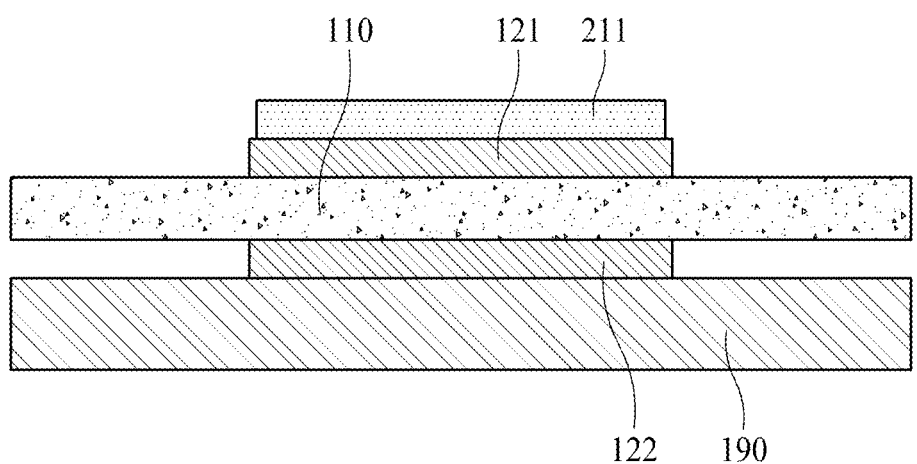

Referring to FIG. 10b, a first passivation layer 211 is disposed on the first electrode 121 of the CCM.

Figure 10C:
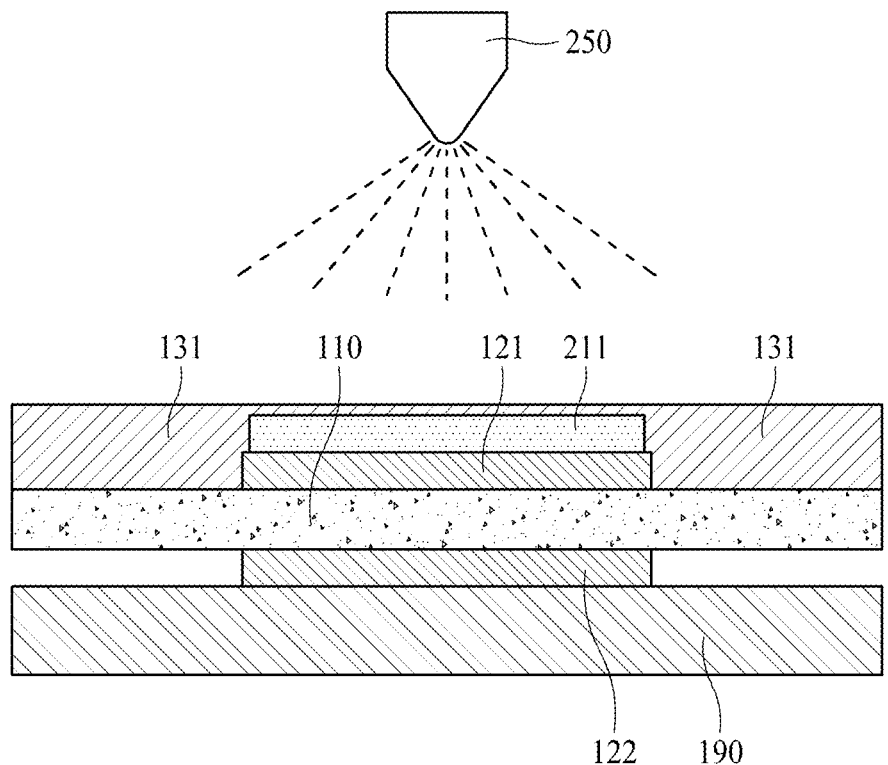

Referring to FIG. 10c, a first sub-gasket 131 is formed on a first surface 111 of the electrolyte membrane 110 by coating a first liquid material.

Figure 10D:
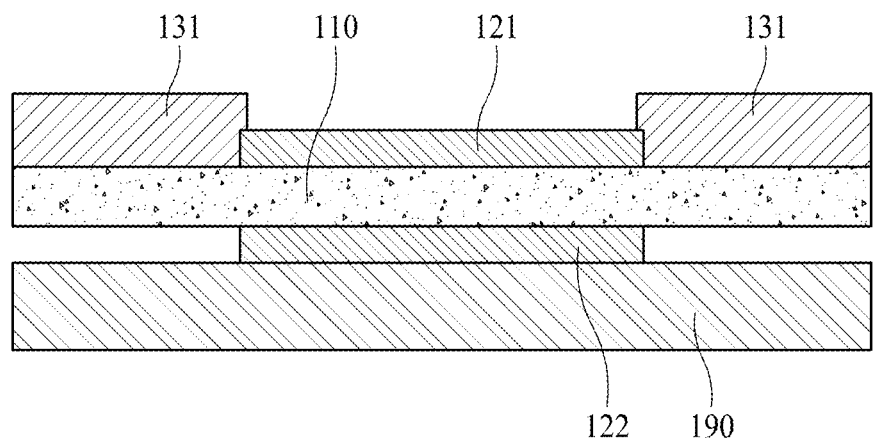

Referring to FIG. 10d, the first passivation layer 211 is removed.

Figure 10E:
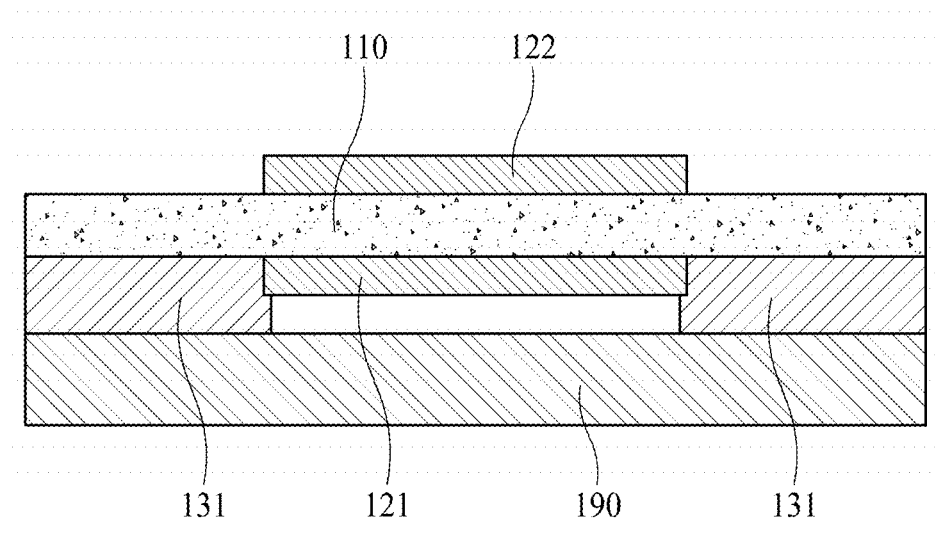

Referring to FIG. 10e, the electrolyte membrane 110 is turned upside down such that a second surface of the electrolyte membrane 110 and the second electrode 122 face upwards.

Figure 10F:
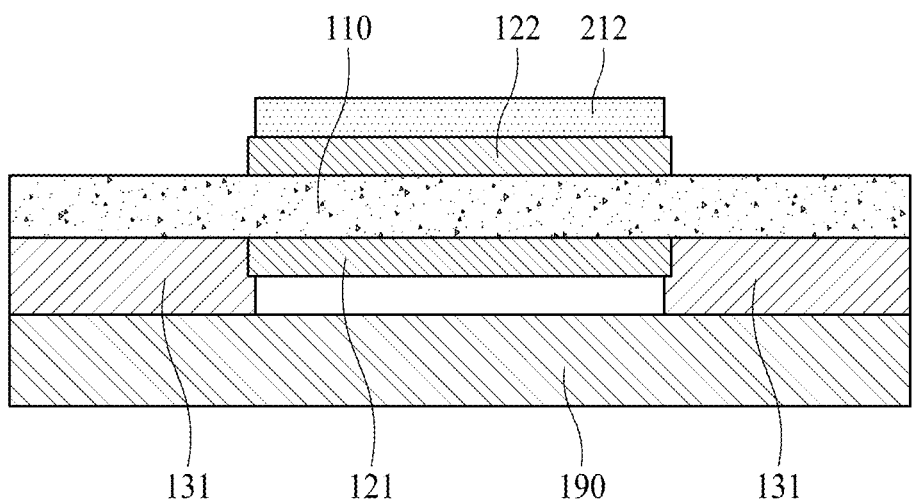

Referring to FIG. 10f, a second passivation layer 212 is disposed on the second electrode 122. The second passivation layer 212 protects the second electrode 122 during a subsequent coating process.

Figure 10G:
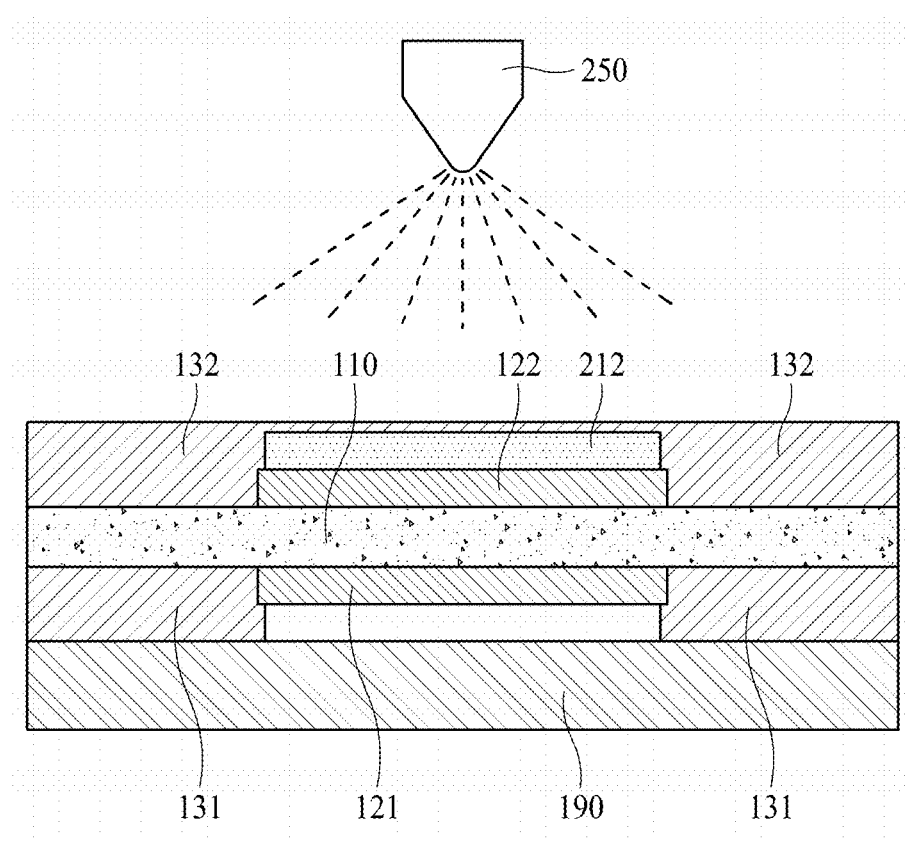

Referring to FIG. 10g, a second sub-gasket 132 is formed on the second surface of the electrolyte membrane 110 by coating a second liquid material.

Figure 10H:
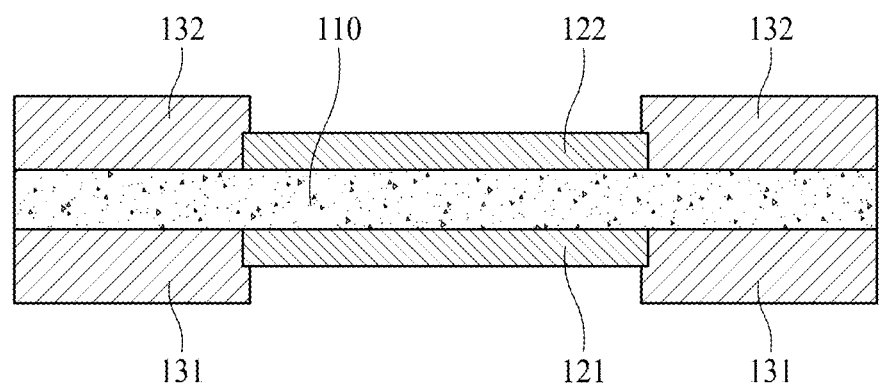

Referring to FIG. 10h, the second passivation layer 212 is removed.

As illustrated in FIGS. 10a to 10h, when the catalyst coated membrane (CCM) is used and the sub-gasket integrated membrane-electrode assembly is manufactured by spray coating, the electrolyte membrane 110 of the CCM, specifically a non-active area thereof cannot be sufficiently supported by the support substrate 190 due to the thicknesses of the electrodes 121 and 122, whereby the membrane-electrode assembly might be curled.

Referring to FIGS. 10a to 10d, it can be seen that the non-active area of the electrolyte membrane 110 is not in tight contact with the support substrate 190 but is spaced apart from the support substrate 190. Due to such spacing, curls might be caused at the non-active area of the electrolyte membrane 110, and thus curls might occur in the resulting membrane-electrode assembly.

The average number of curls per sample and the yield rate were calculated with respect to 100 samples of the membrane-electrode assembly 100 manufactured using the method according to the embodiment of the present disclosure shown in FIGS. 5a to 5h (Example 1) and 100 samples of the membrane-electrode assembly manufactured using the method shown in FIGS. 10a to 10h (Comparative Example 1). The results are shown in Table 1.

The average number of curls per sample means the average of the numbers of curls of 100 samples, and the yield rate means a rate of products that are not defective.

TABLE 1

| Classification | Average number of curls | Yield rate (%) |
| --- | --- | --- |
| Example 1 | 1 | 97 |
| Comparative Example 1 | 8 | 80 |

Referring to Table 1, it can be seen that, in the case in which the membrane-electrode assembly 100 is manufactured according to the embodiment of the present disclosure, the defect rate was low and the average number of curls per sample was small.

Figure 11:
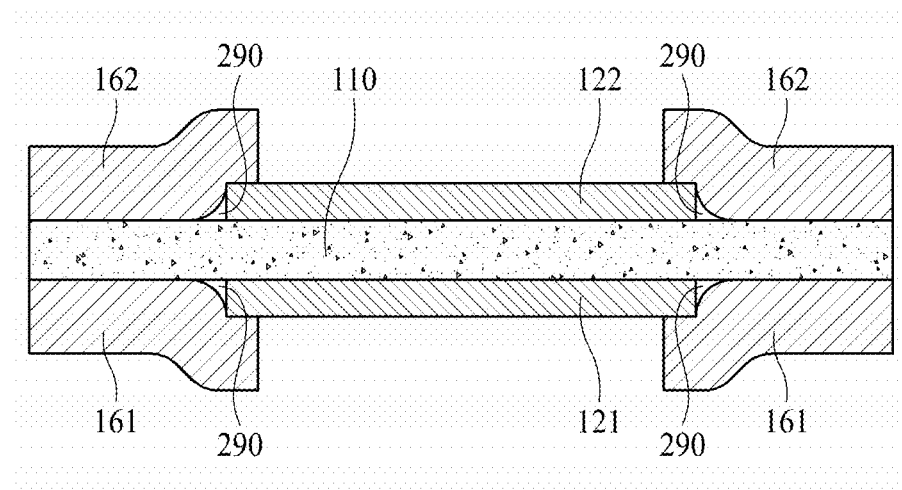
FIG. 11 is a sectional view of a membrane-electrode assembly according to Comparative Example 2.

FIG. 11 is a sectional view of a membrane-electrode assembly according to Comparative Example 2.

In the membrane-electrode assembly of FIG. 11, film type sub-gaskets 161 and 162 are attached.

In case of the film type sub-gaskets 161 and 162, since the thicknesses of the sub-gaskets 161 and 162 are determined based on the film thickness, thickness adjustment is not easy compared to the case where the sub-gaskets 131 and 132 are formed by a direct coating method.

When the film type sub-gaskets 161 and 162 are used, the sub-gaskets 161 and 162 would have steps corresponding to the thicknesses of the electrodes 121 and 122, and air gaps 290 might be caused between the sub-gaskets 161 and 162 and the electrodes 121 and 122 due to such steps. FIG. 11 illustrates the air gaps 290 surrounded by the electrodes 121 and 122 and the film type sub-gaskets 161 and 162. Such air gaps 290 cause leakage of gas, thereby deteriorating the quality of the membrane-electrode assembly.

Assuming that the air gaps 290 have a shape of an isosceles right triangular prism and are respectively formed all around the edges of the quadrangular electrodes 121 and 122, the volume of each air gap created when the film type sub-gaskets 161 and 162 are used may be calculated by the following equation.

$$V(cm^3) = T^2 \times (W+L)$$

where V is the volume of each of the air gaps 290, T is the thickness of each of the electrodes 121 and 122, W is the width of each of the electrodes 121 and 122, and L is the length of each of the electrodes 121 and 122.

In contrast, according to embodiments of the present disclosure, the sub-gaskets 131 and 132 are formed by a direct coating method, whereby the thicknesses of the sub-gaskets 131 and 132 can be variously adjusted. In addition, according to embodiments of the present disclosure, since the sub-gaskets 131 and 132 are manufactured by coating a liquid material, the sub-gaskets 131 and 132 would have no step, or, even though they have a step, the height of the step would be as small as 0.5 times or less, more preferably 0.2 times or less, the thicknesses $T_1$ and $T_2$ of the electrodes 121 and 122 (i.e., the upper surface of each of the sub-gaskets is substantially flat). According to the present disclosure, therefore, the workability in a subsequent process, such as a gas diffusion layer GDL formation/assembly process, can be improved, and any possible air gap which causes leakage of gas can be avoided or minimized (0.5 times or less, more preferably 0.2 times or less, the volume of an air gap formed when a film type sub-gasket is used).

That is, according to an embodiment of the present disclosure, there is no air gap between the first sub-gasket 131 and the first electrode 121 or, even though there is a first air gap between the first sub-gasket 131 and the first electrode 121, the volume of the first air gap would satisfy the Equation 1 below, and there is no air gap between the second sub-gasket 132 and the second electrode 122 or, even though there is a second air gap between the second sub-gasket 132 and the second electrode 122, the volume of the second air gap would satisfy the Equation 2 below.

$$V_1 \leq 0.5 \times T_1^2 \times (W_1 + L_1)$$ Equation 1:

$$V_2 \leq 0.5 \times T_2^2 \times (W_2 + L_2)$$ Equation 2:

where $V_1$ and $V_2$ are the volumes of the first and second air gaps, respectively, $T_1$ and $T_2$ are the thicknesses of the first and second electrodes 121 and 122, respectively, $W_1$ and $W_2$ are the widths of the first and second electrodes 121 and 122, respectively, and $L_1$ and $L_2$ are the lengths of the first and second electrodes 121 and 122, respectively.

Figure 12A:
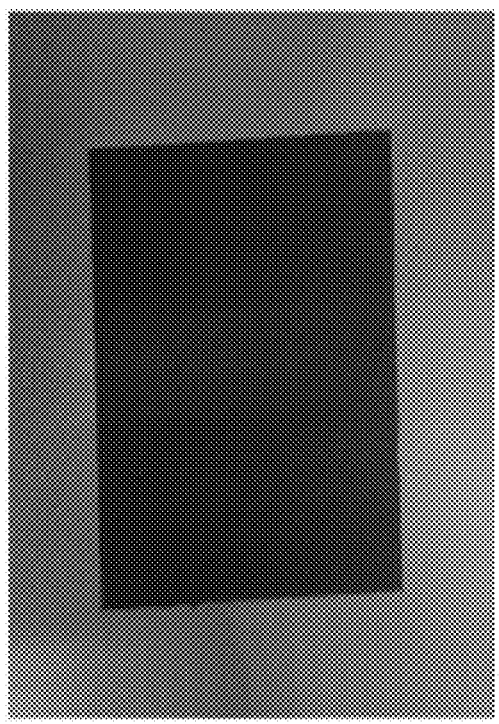
FIGS. 12a to 12c are photographs of membrane-electrode assemblies.
Figure 12B:
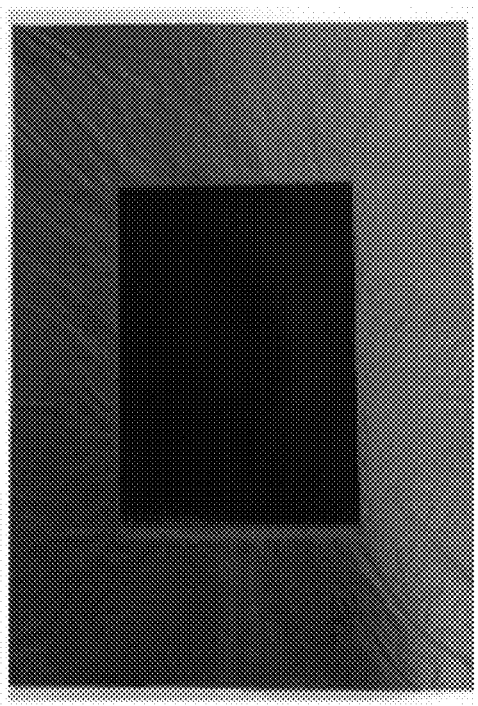
Figure 12C:

FIGS. 12a to 12c are photographs of membrane-electrode assemblies.

Specifically, FIG. 12a is a photograph of the membrane-electrode assembly 100 manufactured using the method shown in FIGS. 5a to 5h, FIG. 12b is a photograph of the membrane-electrode assembly (Comparative Example 1) manufactured using the method shown in FIGS. 10a to 10h, and FIG. 12c is a photograph of the membrane-electrode assembly (Comparative Example 2) having the film type sub-gaskets attached thereto.

Referring to FIG. 12b, it can be seen that the membrane-electrode assembly manufactured according to Comparative Example 1 has a plurality of curls.

An air gap was caused inside the membrane-electrode assembly manufactured according to Comparative Example 2, as shown in FIG. 12c.

In contrast, the membrane-electrode assembly manufactured according to the embodiment of the present disclosure has neither curl nor air gap, as shown in FIG. 12a.

Figure 13:
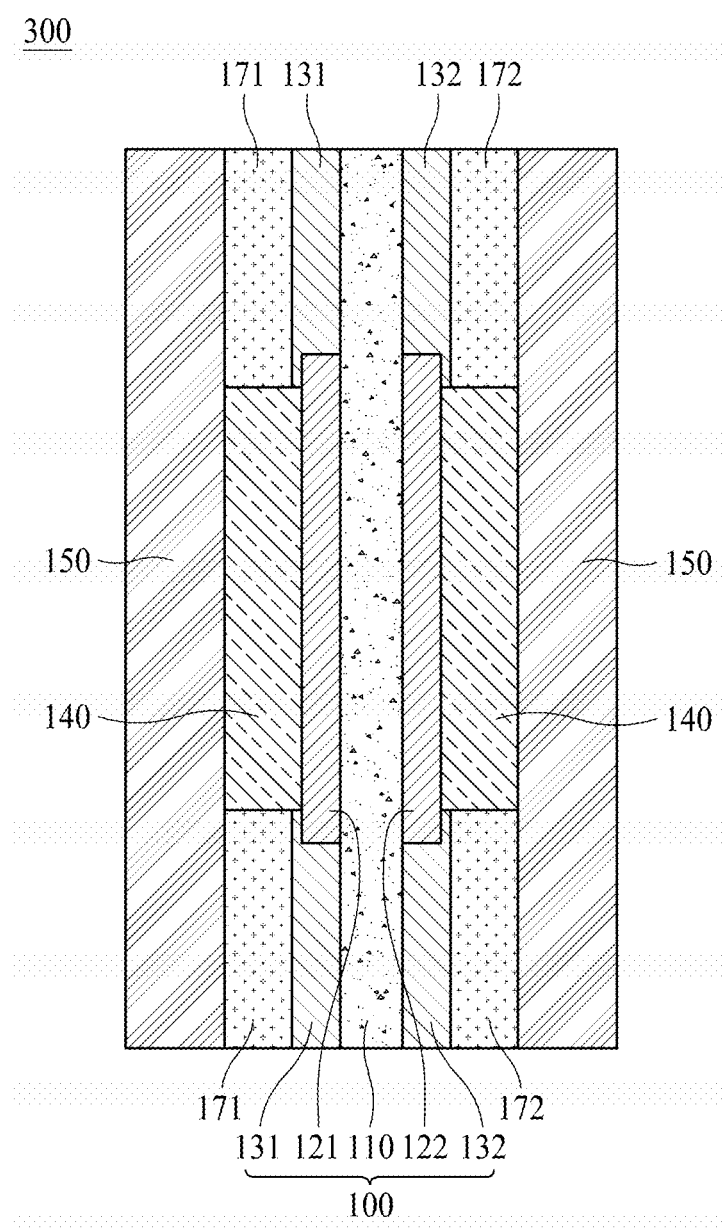
FIG. 13 is a sectional view of a fuel cell according to another embodiment of the present disclosure.

FIG. 13 is a sectional view of a fuel cell 300 according to an embodiment of the present disclosure.

The fuel cell 300 according to the embodiment of the present disclosure includes the membrane-electrode assembly 100 described above, a gas diffusion layer 140 over the membrane-electrode assembly 100, and a separator 150 over the gas diffusion layer 140.

The membrane-electrode assembly 100 includes an electrolyte membrane 110, a first electrode 121 and a first sub-gasket 131 disposed over a first surface of the electrolyte membrane 110, and a second electrode 122 and a second sub-gasket 132 disposed over a second surface of the electrolyte membrane 110.

Each of the gas diffusion layer 140 and the separator 150 may be disposed over both sides of the membrane-electrode assembly 100, respectively. The gas diffusion layer 140 and the separator 150 have been already described, and a detailed description thereof will be omitted.

Referring to FIG. 13, a fuel cell 300 according to another embodiment of the present disclosure may include a first gasket 171 and a second gasket 172.

The first gasket 171 and the second gasket 172 are disposed between the membrane-electrode assembly 100 and the separators 150 to hermetically seal the spaces defined between the membrane-electrode assembly 100 and the separators 150. Referring to FIG. 13, the gas diffusion layers 140 may be disposed in a space defined by the first sub-gasket 131 and the first gasket 171 and a space defined by the second sub-gasket 132 and the second gasket 172.

FIG. 13 illustrates the gas diffusion layers 140 formed only on exposed portions of the first and second electrodes 121 and 122. However, the present disclosure is not limited thereto. The gas diffusion layers 140 may extend so as to cover at least a portion of each of the first and second sub-gaskets 131 and 132.

The above embodiments are provided to assist in understanding of the present disclosure, and the scope of right of the present disclosure is not limited thereby. The scope of right of the present disclosure is defined by the following claims.

The invention claimed is:

1. A membrane-electrode assembly comprising:
an electrolyte membrane having a first surface and a second surface opposite to the first surface, the electrolyte membrane comprising an active area and a non-active area surrounding the active area;
a first electrode disposed over the first surface of the electrolyte membrane, the first electrode covering the active area;
a first sub-gasket disposed over the first surface of the electrolyte membrane, the first sub-gasket having a first window to expose a central part of the first electrode, the first sub-gasket having a first sub-gasket surface facing the electrolyte membrane and a first opposite surface, wherein the first sub-gasket is formed by directly coating a first liquid material over the first surface of the electrolyte membrane such that at least a portion of the first sub-gasket is in direct contact with the first surface of the electrolyte membrane;
a second electrode disposed over the second surface of the electrolyte membrane, the second electrode covering the active area; and
a second sub-gasket disposed over the second surface of the electrolyte membrane, the second sub-gasket having a second window to expose a central part of the second electrode, the second sub-gasket having a second sub-gasket surface facing the electrolyte membrane and a second opposite surface, wherein the second et is formed by directly coating a second liquid material over the second surface of the electrolyte membrane such that at least a portion of the second sub-gasket is in direct contact with the second surface of the electrolyte membrane,
wherein,
the first sub-gasket comprises a first overlap area overlapping an edge of the first electrode and a first non-overlap area covering the non-active area,
there is no step between the first overlap area and the first non-overlap area on the first opposite surface of the first sub-gasket, the second sub-gasket comprises a second overlap area overlapping an edge of the second electrode and a second non-overlap area covering the non-active area, and there is no step between the second overlap area and the second non-overlap area on the second opposite surface of the second sub-gasket.

2. The membrane-electrode assembly according to claim 1, wherein, there is no air gap between the first sub-gasket and the first electrode or, even though there is a first air gap between the first sub-gasket and the first electrode, a volume of the first air gap satisfies Equation 1 below, and there is no air gap between the second sub-gasket and the second electrode or, even though there is a second air gap between the second sub-gasket and the second electrode, a volume of the second air gap satisfies Equation 2 below:

$$V_1 \leq 0.5 \times T_1^2 \times (W_1 + L_1)$$ Equation 1:

$$V_2 \leq 0.5 \times T_2^2 \times (W_2 + L_2)$$ Equation 2:

where $V_1$ and $V_2$ are volumes of the first and second air gaps, respectively, $T_1$ and $T_2$ are thicknesses of the first and second electrodes, respectively, $W_1$ and $W_2$ are widths of the first and second electrodes, respectively, and $L_1$ and $L_2$ are lengths of the first and second electrodes, respectively.

3. A fuel cell comprising:

the membrane-electrode assembly according to claim 1;

a gas diffusion layer over the membrane-electrode assembly; and a separator over the gas diffusion layer.

4. A method for manufacturing a membrane-electrode assembly, the method comprising:

forming a first electrode over a first surface of an electrolyte membrane;

forming a first sub-gasket over the first surface of the electrolyte membrane by coating a first liquid material;

forming a second electrode over a second surface of the electrolyte membrane; and forming a second sub-gasket over the second surface of the electrolyte membrane by coating a second liquid material, wherein, when forming the first electrode, the electrolyte membrane is supported by a support substrate.

5. The method according to claim 4, further comprising at least one of:

disposing a first passivation layer over the first electrode before forming the first sub-gasket; and disposing a second passivation layer over the second electrode before forming the second sub-gasket.

6. The method according to claim 5, further comprising removing at least one of the first and second passivation layers.

7. The method according to claim 5, wherein each of the first and second passivation layers comprises at least one selected from the group consisting of polyethylene terephthalate (PET), polyimide (PI), tetrafluoroethylene, polyethylene (PE), rubber, and silicone.

8. The method according to claim 4, wherein the first electrode is formed by coating or transfer.

9. The method according to claim 4, wherein the first and second sub-gaskets are respectively formed by means of any one selected from the group consisting of spray coating, comma coating, and slot die coating, each of which uses a liquid material.

10. The method according to claim 4, wherein at least one selected from the group consisting of a 3D printer and a partial coating apparatus is used to form the first and second sub-gaskets.

11. The method according to claim 4, wherein each of the first and second liquid materials includes an elastic material that is crosslinkable or curable.

12. The method according to claim 4, wherein the first and second liquid materials are identical to each other.

13. The method according to claim 4, wherein the first and second liquid materials are different from each other.

14. The method according to claim 4, wherein each of the first and second sub-gaskets comprises at least one selected from the group consisting of polyethylene terephthalate (PET), polyamide, tetrafluoroethylene/hexafluoropropylene (FEP), fluorine rubber, silicone rubber, hydrocarbon-based elastomer, and polyurethane.

15. The method according to claim 4, wherein, in at least one of the step of forming the first sub-gasket and the step of forming the second sub-gasket, the first or second sub-gasket is heated at a temperature of 40 to 150° C. after coating.

16. The method according to claim 4, wherein, in at least one of the step of forming the first sub-gasket and the step of forming the second sub-gasket, the first or second sub-gasket is thermally treated using hot air for 3 to 300 seconds after coating.

17. The method according to claim 4, further comprising cutting at least a portion of the electrolyte membrane before forming the first sub-gasket.

18. A method for manufacturing a membrane-electrode assembly, the method comprising:

forming a first electrode over a first surface of an electrolyte membrane;

forming a first sub-gasket over the first surface of the electrolyte membrane by coating a first liquid material;

forming a second electrode over a second surface of the electrolyte membrane; and forming a second sub-gasket over the second surface of the electrolyte membrane by coating a second liquid material, wherein, in at least one of the step of forming the first sub-gasket and the step of forming the second sub-gasket, the first or second sub-gasket is left for 10 to 600 seconds after coating.

* * * * *